(12) United States Patent
C. Garcia et al.

(10) Patent No.: US 11,638,035 B2
(45) Date of Patent: Apr. 25, 2023

(54) HARDWARE-FRIENDLY TRANSFORM METHOD IN CODECS FOR PLENOPTIC POINT CLOUDS

(71) Applicant: SAMSUNG ELETRÔNICA DA AMAZÔNIA LTDA., São Paulo (BR)

(72) Inventors: Diogo C. Garcia, Brasilia (BR); Ricardo L. De Queiroz, Brasilia (BR); Camilo C. Dorea, Brasilia (BR); Renan U. B. Ferreira, Brasilia DF (BR); Davi R. Freitas, Brasilia DF (BR); Rogério Higa, Campinas-SP (BR); Vanessa Testoni, Campinas-SP (BR); Ismael Seidel, Campinas-SP (BR)

(73) Assignee: SAMSUNG ELETRÔNICA DA AMAZÔNIA LTDA., Campinas (BR)

( * ) Notice: Subject to any disclaimer, the term of this patent is extended or adjusted under 35 U.S.C. 154(b) by 0 days.

(21) Appl. No.: 17/405,682

(22) Filed: Aug. 18, 2021

(65) Prior Publication Data
US 2022/0337874 A1    Oct. 20, 2022

(30) Foreign Application Priority Data
Apr. 9, 2021 (BR) .................. 10 2021 006869-8

(51) Int. Cl.
*H04N 19/60* (2014.01)
(52) U.S. Cl.
CPC .................................. *H04N 19/60* (2014.11)
(58) Field of Classification Search
CPC ....................................................... H04N 19/60

USPC ..................................................... 375/240.18
See application file for complete search history.

(56) References Cited

U.S. PATENT DOCUMENTS

| 9,179,162 B2 | 11/2015 | Cook et al. |
| 10,853,973 B2 | 12/2020 | Tourapis et al. |
| 2006/0085497 A1* | 4/2006 | Sehitoglu .............. G06F 17/142 708/405 |
| 2015/0172718 A1 | 6/2015 | Budagavi et al. |
| 2020/0226198 A1 | 7/2020 | Budagavi |

FOREIGN PATENT DOCUMENTS

| WO | WO 2020-145689 A1 | 7/2020 |
| WO | WO-2021194069 A1 * | 9/2021 |

OTHER PUBLICATIONS

Stephan Pfletschinger and Frieder Sanzi, "Iterative Demapping for OFDM with Zero-Padding or Cyclic Prefix", IEEE International Conference on Communications, 2004. (Year: 2004).*

(Continued)

*Primary Examiner* — Ayman A Abaza
(74) *Attorney, Agent, or Firm* — Staas & Halsey LLP

(57) ABSTRACT

A hardware-friendly transform method in codecs for plenoptic point clouds. Given that existing video-based point cloud compression codec (V-PCC) is based on multimedia processor video codecs embedded in System-on-Chip (SoC) mobile devices, the remaining V-PCC steps should be as efficient as possible to ensure fair power consumption. In this sense, the method seeks to reduce the complexity of the transform, using integer transforms and imposing limits on the number of distinct transform dimensions, in which these limits are designed in order to minimize the losses of coding efficiency.

9 Claims, 17 Drawing Sheets

(56) References Cited

OTHER PUBLICATIONS

Li Li et al., "Video-based compression for plenoptic point clouds", arXiv:1911.01355, V 1, Nov. 4, 2019.
Gustavo Sandri et al., "Compression of Plenoptic Point Clouds", IEEE Transactions on Image Processing, vol. 28, No. 3, Mar. 2019.
Guobin Shen et al., "Arbitrarily Shaped Transform Coding Based on a New Padding Technique", IEEE Transactions on Circuits and Systems for Video Technology, vol. 11, No. 1, Jan. 2001.

* cited by examiner

HARDWARE-FRIENDLY TRANSFORM METHOD IN CODECS FOR PLENOPTIC POINT CLOUDS

CROSS-REFERENCE TO RELATED APPLICATION(S)

This application is based on and claims priority under 35 U.S.C. § 119 to Brazilian Patent Application No. BR 10 2021 006869-8, filed on Apr. 9, 2021, in the Brazilian Intellectual Property Office, the disclosure of which is incorporated by reference herein in its entirety.

TECHNICAL FIELD

The present invention concerns a hardware-friendly transform method in codecs for plenoptic point clouds. Because the existing video-based point cloud compression codec (V-PCC) is based on video codecs from multimedia processors embedded in mobile devices System-on-Chip (SoC), the remaining Steps of V-PCC should be as efficient as possible to ensure fair power consumption. A dedicated hardware accelerator can be about 1000× more energy efficient than a general-purpose CPU. Using hardware-friendly transforms, a plenoptic point clouds codec can be easily integrated into mobile devices.

The present invention can be implemented in various devices that use point clouds, such as immersive displays, holographic smartphones, cameras, AR/VR/MR devices, Smart TV etc.

The method proposed in this invention seeks to reduce the complexity of the transform, using integer transforms and imposing limits on the number of distinct dimensions in the transform. Furthermore, these limitations are designed to minimize coding efficiency losses. While bringing benefits to any form of implementation, using a limited number of integer transforms has its most significant advantages when considering hardware accelerators specially designed to perform the transform. In these cases, the proposed method provides transforms that reduce dynamic energy consumption and the occupied silicon area (related to the chip area and, therefore, to the final cost of production). Both terms influence the energy efficiency of the transform, being extremely important in mobile devices, given the energy limitation imposed by their batteries. Therefore, this invention ensures a good balance between coding efficiency and complexity (energy efficiency).

BACKGROUND

Point clouds have recently been used in applications that involve real-time capture and rendering of 3D objects, as this volumetric representation allows for a more immersive experience and is suitable for scanning real-world objects. The most common representation of a point cloud uses only a single color associated with each point or voxel, which gives a good description of the geometry and texture. However, this representation fails to capture the natural dynamic light reflections of the object in a realistic manner. The reflected light can change with the viewing angle, but in the single-color representation all viewing angles have the same color value.

A more complete representation, called the plenoptic point cloud, was proposed where each point has an associated color in multiple directions. In normal representation, the point cloud is described as spatial coordinate and a color. For the plenoptic point cloud multiple color attributes are added to the parameters of point clouds. This representation preserves the view-dependent color information. All materials that reflect light, such as precious metals in jewels, are examples of objects that could be better represented by plenoptic point clouds. Another example is iridescent objects such as shells and some car paintings.

In the regular process of generating point clouds, the information is captured by an array of cameras. The colors captured by these cameras are then combined to produce a single point color, and the view-dependent color information is lost in the process. Therefore, the same capture process can be used to generate the plenoptic point clouds. The view-dependent color information is then preserved using the multiple attributes.

Point clouds are typically represented by extremely large amounts of data, which is a significant barrier to general applications. However, the relative ease of capturing and render spatial information from point clouds compared to other volumetric video representations makes point clouds increasingly popular for presenting immersive volumetric data. Therefore, the MPEG 3DG standardization group has worked for many years to efficiently compress point cloud data and recently released its first standard, called V-PCC (Video-Based Point Clouds Compression).

The V-PCC encoder implementation provides compression in the range of 100:1 to 300:1, and therefore a dynamic point cloud of one million points could be encoded in 8 Mbit/s with good perceptual quality. Real-time decoding and rendering of V-PCC bitstreams has also been demonstrated on today's mobile devices. Due to this performance, the V-PCC is expected to be successfully adopted by the market soon.

Although there have been some attempts to compress plenoptic point clouds in the standardization group, the current standard only supports compression of the plenoptic point clouds treating them as multiple individual attributes. The problem with this approach is that the correlation between plenoptic colors is not explored, preventing efficient compression from being achieved. The use of hybrid (differential and transform) encoding on top of V-PCC increases V-PCC encoding efficiency by up to 90% (BD-Rate) by adopting an arbitrary-sized floating-point Discrete Cosine Transform (DCT) compared to multiple attribute encoding.

In addition, the ability of mobile devices to capture plenoptic point clouds is yet to mature and, therefore the encoding will initially be handled by powerful servers. In this way, mobile devices should be able to receive and decode such content as energy efficient as possible. In this sense, the focus of this invention is to improve the energy efficiency of the decoder since most of the encoded content will probably be decoded several times.

Patent document U.S. Pat. No. 10,853,973, entitled "Point cloud compression using fixed-point numbers", published on Dec. 1, 2020, by APPLE INC., provides a system for encoding and decoding point clouds that uses fixed-point numerical representation when determining predicted attribute values and attribute correction values. The main difference is that the present invention focuses on the transform part of a plenoptic point cloud encoder, while patent document U.S. Pat. No. 10,853,973 uses fixed-point arithmetic during attribute prediction and correction.

Patent document WO2020145689, titled "Method and apparatus for improving image padding in video-based point-cloud compression codec", published on Jul. 16, 2020, by SAMSUNG ELECTRONICS CO. LTD., provides an encoding device and method for encoding point clouds that reduces and then increases the resolution of frames by using padding to modify pixels in those frames that are not from the point cloud data. The main difference is that the present invention deals with padding in the transform step of encoding plenoptic point clouds that happens before padding the attribute image. Moreover, while WO145689 improves 2D padding, the present invention tries to avoid 1D padding completely in this invention.

The article "Compression of plenoptic point clouds", published in March, 2019 by G. Sandri, R. L. de Queiroz and P. A. Chou presents a method where transform coefficients are encoded using an encoder based on the region-adaptive hierarchical transform (RAHT). The main difference is that the present invention addresses the hybrid encoding of plenoptic point clouds considering video-based encoding (V-PCC) instead of a geometric hierarchical transform.

The article "Video-based compression for plenoptic point clouds" published in 2019, by L. Li, Z. Li, S. Liu and H. Li, uses the multi-view extension of HEVC (MV-HEVC) to encode multiple color attributes as if they were multiple views of the same object. The main difference is that the present invention advances the technology of encoding plenoptic point clouds considering the video compression supported by the video-based point cloud compression (V-PCC) standard. In addition, the present invention further explores the transforms of views in such a scope.

Patent document BR 102020020345-2, entitled "Method for compression of point clouds", filed on Oct. 2, 2020, by SAMSUNG ELETRÔNICA DA AMAZÔNIA LTDA., provides a method to compress the plenoptic point clouds using a hybrid approach (differential and transform coding) on top of the V-PCC codec. In that invention, the transformed residual views are represented as multiple attributes. The present invention advances the technique by exploiting an asymmetric transform design in the encoder and decoder to ensure that the decoder has the least possible complexity, while keeping the coding efficiency as close as possible to that which adopts arbitrary-sized and floating-point transforms in both encoder and decoder. Although in an embodiment of the present invention the Hadamard transform is used in the decoder, the forward transform design is one of the main advantages of this invention. An embodiment of the present invention does not explore the asymmetry of the transform but contains a new set of unpublished transforms coefficients.

Patent document US20150172718, entitled "Low complexity large transform" published on Jun. 18, 2015, by TEXAS INSTRUMENTS INC., provides methods for encoding and decoding video streams using a low-complexity large transform. In that invention, large Hadamard transforms are combined with small Discrete Cosine Transforms (DCT) to provide a large 2D transform used in video codecs for large 2D residue blocks. The main difference is that the present invention focuses on the 1D transform of vectors containing samples of plenoptic point clouds and tackles the complexity reduction by using integer transforms and imposing limits on the number of distinct transform sizes without compromising too much the coding efficiency.

Patent document US20200226198 entitled "Unified forward and inverse transform architecture" published on Jul. 16, 2020, by TEXAS INSTRUMENTS INC., provides methods for a unified forward and inverse 2D transform architecture considering multiple sizes, but only powers of two, that can share hardware circuits. The main difference is that the present invention focuses on the 1D transforms for plenoptic point cloud coding that can be permuted to reorder the decoded views to compensate for a possible reordering of the views in the encoder. In addition, an embodiment of the present invention allows the use of integer transforms of arbitrary size that approximate the DCT, which are different from the coefficients presented in document US20200226198.

Patent document U.S. Pat. No. 9,179,162, entitled "Image transform zero coefficient selection and zero-skip transmission for arbitrary shape transform coding", published on Nov. 3, 2015, by FUTUREWEI TECHNOLOGIES INC., provides methods and apparatus for performing 2D separable transforms with arbitrary shapes over 2D pixel blocks for video coding, masking pixels and ensuring that at least the padded positions are not transmitted. As in the article titled "Arbitrarily Shaped Transform Coding Based on a New Padding Technique", published in 2001 by G. Shen, B. Zeng, and Ming Lei Liou, the 2D transform relies on optimal padding considering floating-point transforms. However, the present invention focuses on the 1D transform on a list of views for cloud coding of plenoptic points.

SUMMARY

The present invention transforms the plenoptic point clouds in a hardware-friendly fashion without decreasing too much the coding efficiency of a hybrid transform approach that is not so hardware-friendly, comprising: a limited or arbitrary number of transform sizes available in the encoder where the sizes can be powers of two; arbitrary type of operations on the encoder side (integer, fixed-point, floating-point); the correct scaling of transformed data to be encoded by a video codec; a limited number of transforms available on the decoder side where the sizes are powers of two; integer or fixed point operations on the decoder side where the multiplications can be performed by means of additions and shifts; correct ordering of inverse transformed values wherein this order can be applied to the inverse transform matrix or direct in the inverse transformed vector; the discarding of unwanted views.

According to an embodiment of the present invention, applying the direct and inverse transform in a plenoptic point cloud comprises: determining an adapted Hadamard matrix considering the number of views to be transformed; performing the transform on point cloud data using the adapted Hadamard matrix; encoding the transformed data; decoding the transformed data; zero-padding in the decoded transformed data; performing the transform on the zero-padded decoded data using a Hadamard matrix of natural order, such that the size of the transform is the nearest larger power of two; discarding the last views that are not part of the original set of views.

According to another embodiment of the present invention, the direct and inverse transform of views of a plenoptic point cloud is presented, comprising: determining a floating-point/fixed point transform matrix considering the number of views to be transformed; transforming the point cloud data using the floating-point/fixed-point transform matrix; encoding the transformed data; decoding the transformed data; zero-padding the decoded transformed data; reordering the power size of two sized inverse transform matrix through permutation such that, after the transform, the last views can be discarded; performing the transform of the padded views using the reordered transform matrix; discarding the last views that are not part of the original set of views; scaling the remaining values according to the inverse matrix being used.

According to another embodiment of the present invention, it is provided a method of forward and inverse transforming views of a plenoptic point cloud, comprising: determining an integer approximation of the DCT matrix with arbitrary size; performing the transform of point cloud data using the adapted integer approximation of the DCT; encoding the transformed data; decode the transformed data; transforming the decoded data using the integer DCT approximation.

Embodiments described in this invention may be implemented in hardware, software or a combination of them. If implemented in software, the methods may run on systems of one or more cores that exploit parallelism. If implemented in hardware, the methods can also be implemented by considering the transform of one vector at a time or in parallel to process many vectors, since there is no dependency in the transform. They can be embedded into an Application Specific Integrated Circuit (ASIC), programmed into a Field Programmable Port Arrangement (FPGA), or a Digital Signal Processor (DSP). Moreover, while this invention was described with a limited number of embodiments, a person skilled in the art could elaborate other embodiments that deal with other transforms sizes, or even with a different scope than the coding of plenoptic point clouds, starting from the knowledge presented throughout the present invention.

The hybrid approach (differential+transformed) adopted in the state of the art for the encoding of plenoptic point clouds that is built on top of the V-PCC brings coding efficiency benefits of up to 90% compared to conventional multi-attribute encoding, supported in V-PCC. This approach is based on a Plenoptic Attribute Encoder and Plenoptic Attribute Decoder.

The problem being faced by the present invention is how to reduce the complexity of the transform without compromising too much the coding efficiency. If a single point cloud frame with N views is projected into N frames with resolution 5120×5120, the transform runs 26,214,400 times. If the full sequence is only 30 seconds long and captured at 60 frames/second, the transform is calculated about 47 billion times. In addition, to increase the accuracy in the representation of the plenoptic function, more views are desired. With more views, the number of operations on the transform increases. Therefore, the complexity of each operation should be considered to evaluate the whole complexity of the transform. For mobile devices, energy efficiency is extremely important, such that energy efficiency can be seen as synonymous with complexity. A person skilled in the art may recognize that the use of integer arithmetic is more advantageous in terms of energy efficiency than floating-point arithmetic. Table 1 shows an estimate of two basic 32-bit operations considering integer and floating-point arithmetic:

TABLE 1

| Operation | Energy Consumption Estimation (pJ) |
|---|---|
| Add Integer | 0.1 |
| Multiply Integer | 3.1 |
| Add Floating Point | 0.9 |
| Multiply Floating Point | 3.7 |

It is possible to notice that although the difference between the integer and floating-point multiplication is small, the difference considering the addition is significant (9× more energy for the floating-point). Nevertheless, multiplying integers consumes about 31× more energy than addition, so it will be a dominant factor in any transform that uses multiplication. However, in the case of integer transforms, if the transform coefficients are known beforehand, they can be implemented as additions and shifts instead of using multipliers. Additions have, according to Table 1, a low energy demand, while shifts can be implemented efficiently in hardware by simply rearranging the interconnection wires. For example, coefficient 42 can be decomposed into $32+8+2=2^5+2^3+2^1$, so 42 multiplied by some variable x can be performed as $42 \times x=(x<<5)+(x<<3)+(x<<1)$, i.e. using only 2 additions. Therefore, instead of using 3.1 pJ, it is possible to perform the same operation using only 0.2 pJ of energy, which is 15.5× more energy efficient. In this case, the adoption of integer arithmetic presents clear advantages.

However, a second problem that arises when considering hardware accelerators is the occupied silicon area. A specific transform for each size (that is, for each possible number of views) would require a large area, while only a small portion of that circuit, corresponding to a transform size, would be active during transform computation. A known workaround is to adopt only power of two sized transforms. For instance, instead of having a specific transforms architecture for sizes 3, 4, 5, 6, 7, 8, 9, 10, 11, 13, 14, 15, and 16 views, only the sizes 4, 8, and 16 would be present. This means a reduction from 13 to 3 in the number of distinct transforms, considering only the range between 3 and 16.

Although the state of the art makes use of an integer transform that by definition has a limited number of sizes (Hadamard transform), it requires a padding scheme. To avoid sending the extra information due to the padding and consequent reduction of coding efficiency due to the increase in the rate, such information is discarded on the encoder side (it is not transmitted). The decoder also needs zero-padding in place of the discarded information. This also impairs coding efficiency, this time on distortion, as the reconstruction will not be perfect due to the lack of information that was discarded by the encoder.

BRIEF DESCRIPTION OF DRAWINGS

The objectives and advantages of the present invention will be clearer through the following detailed description of the example and the non-limiting drawings presented at the end of this document.

DETAILED DESCRIPTION

Figure 1:
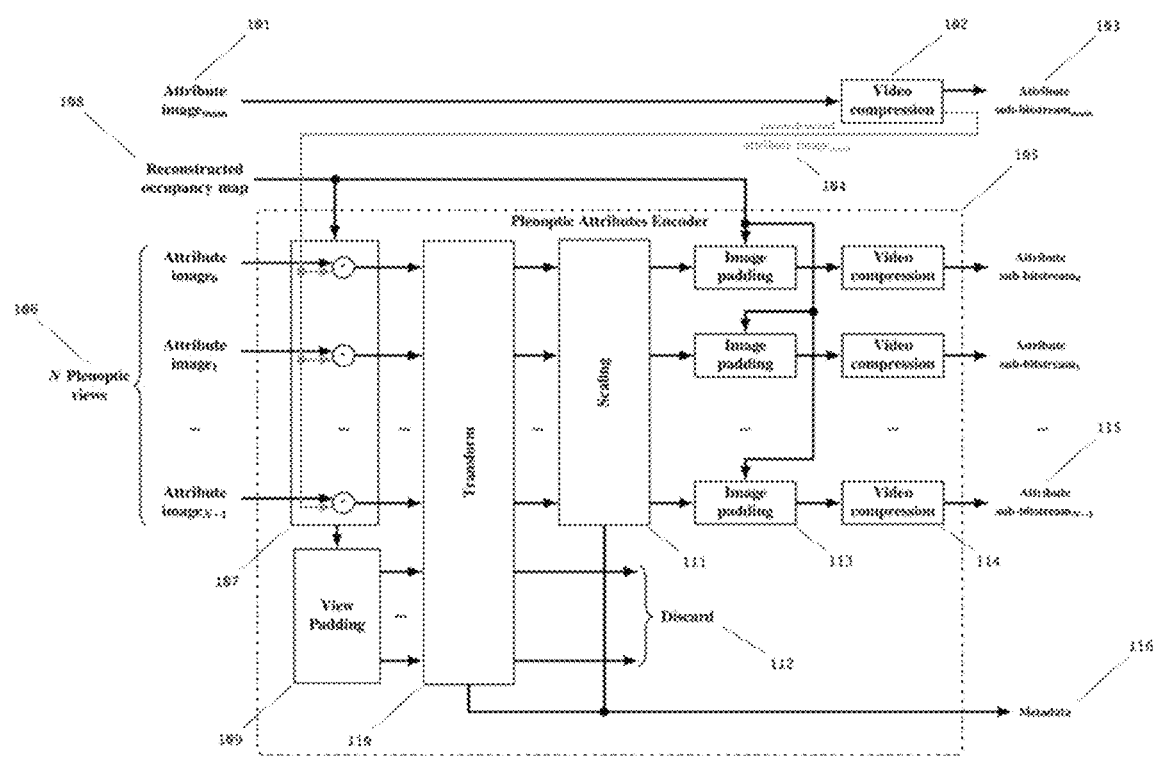
FIG. 1 illustrates an expanded view of the Plenoptic Attribute Encoder of the state of the art.

FIG. 1 illustrates an expanded view of the Plenoptic Attribute Encoder of the state of the art. The attribute image main (101), which is a video frame obtained by projecting color information from the point cloud, goes through a video compression (102) generating the attribute sub-bitstream main (103) that is embedded in the full compressed bitstream. The reconstructed attribute image main (104) is the equivalent image being retrieved in the decoder. The differential encoder (107) within the Plenoptic Attribute Encoder (105) uses the reconstructed attribute image main (104) and the plenoptic views attribute images (106) to generate differential images. A view padding (109) may be required before the transform (110), which converts the differential images into a compact representation. The present invention improves the stages of padding and transform. Therefore, they will be more detailed later. The scaling (111) performs mapping to the range supported by video compression, from 0 to 255 in the case of an 8-bit video encoder. An additional step of adding 128 or half of the supported range is added to the scaling process, depending on the type of transform coefficient being generated. Some coefficients can be discarded before, such as padded ones (112), or after scaling. Then the remaining transformed images go through an image padding process (113) to generate an image suited for video compression. Video compression (114) generates the plenoptic attributes sub-bitstreams (115). Transform and scaling metadata (114) are also sent to the compressed bitstream. The reconstructed occupancy map (108) can be used by the differential encoder to ignore the values in unoccupied pixels and is used by image padding.

Figure 2:
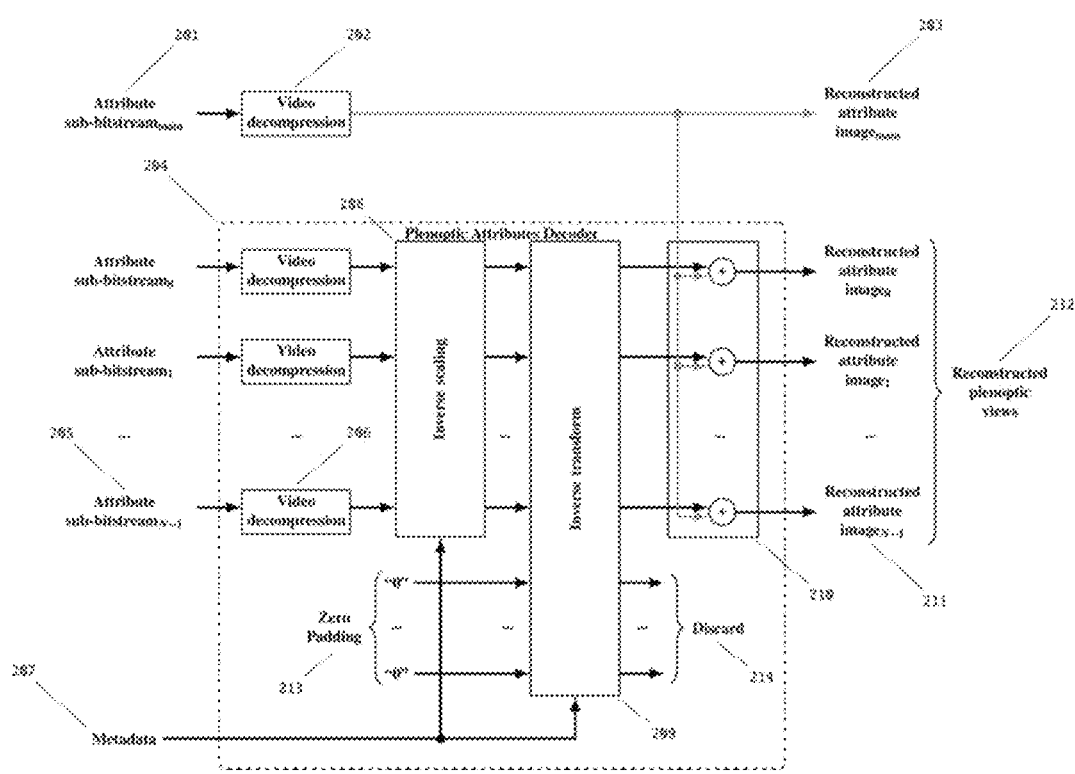
FIG. 2 illustrates an expanded view of the Plenoptic Attributes Decoder of the state of the art.

An expanded view of the Plenoptic Attribute Decoder is illustrated in FIG. 2. The attribute sub-bitstream main (201) is decoded using video decompression (202) generating the reconstructed attribute image main (203). In the Plenoptic Attribute Decoder (204), video decompression (206) decodes attribute sub-bitstreams (205). The inverse scaling (208) using plenoptic metadata information (207) remaps the values to the range of the used transform. The inverse transform (209) returns the data to the differential coder format, which is added to the reconstructed attribute image main (203) generating the reconstructed attribute images (211). The reconstructed plenoptic views (212) are passed to the video-based point cloud decoder for the complete plenoptic point cloud reconstruction. If the number of views is not compatible with the inverse transform size (209), padding with zero (213) can be applied. In this case, views that are not part of the actual point cloud are discarded (214).

Figure 3:
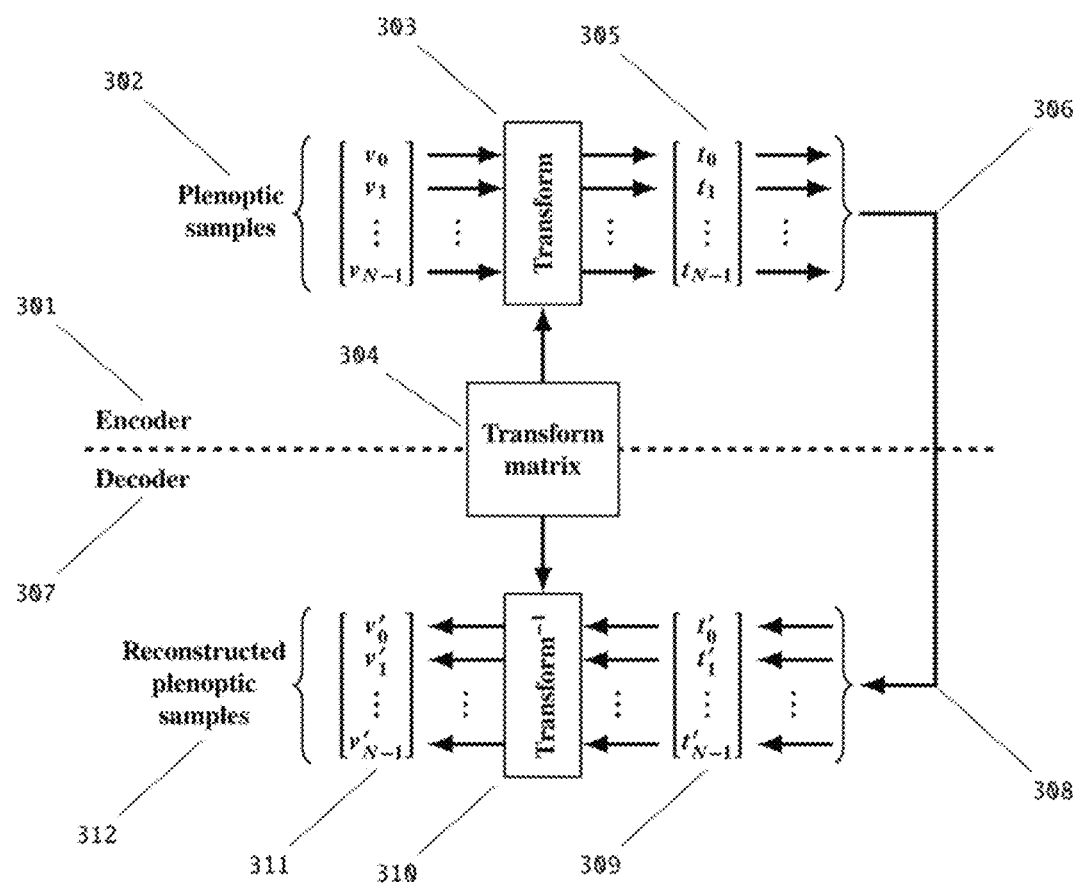
FIG. 3 shows the common method for performing a direct and inverse 1D transform.

FIG. 3 shows the common method for performing a forward and inverse 1D transform, considering the data flow of a plenoptic point clouds codec, such as the one from FIGS. 1 and 2. In the encoder (301), each vector v of N plenoptic samples (302) constructed with one sample of each of the N attribute images (106) or residual attribute images (107) is transformed (303) using a transform matrix (304). This process is performed for each vector of samples from the attribute images from plenoptic views(106).

A forward 1D transform over a vector v with N positions uses a transform matrix M with N×N values, denoted as $M_N$. Thus, the transformed vector t (305) is the result of a multiplication of the transform matrix $M_N$ with the input vector v, that is:

$$t = M \times v$$

The obtained transformed vector (305) is forwarded to the next encoding steps (306), such as the scaling (110). On the decoder side (307), after the initial steps of the Plenoptic Attribute Decoder (308) the already scaled decoded transform samples (309) are inversely transformed (310), using the inverse of the transform matrix (304) that was used in the encoder. In general, because the transform matrix is designed to be orthonormal, the inverse transform matrix is the transposition of the forward transform matrix. For example, when the transform is the floating-point DCT, the inverse matrix is equal to the transposed DCT matrix. The same is true for the integer DCT of HEVC. Given its symmetry, for the case where the transform matrix is Hadamard, the inverse is Hadamard itself, that is, $H^{-1} = H$.

Assuming a scenario in which no loss of information was imposed to t after the transform in such a way that t'=t, the executed operation is:

$$v' = M^{-1} \times t' = \overbrace{M^{-1} \times \underbrace{M \times v}_{t'=t}}^{I_N} = v$$

Thus, in this case, the output vector v' (311) is equal to the input vector v (302). This means that the reconstructed plenoptic samples (312) have been perfectly reconstructed. Of course, to achieve compression, it is expected loss of information and thus t'≠t, resulting in v'≠v.

By restricting the number of available transforms, such as allowing the codec to use only power of two sized transforms, there is not always one $M_N$ for all possible N. Therefore, the vector v must be adjusted to become compatible with one of the available transform sizes. To do this, a padding method must be used. A possible padding method is based on repeating the last available value in v until the new padded vector size p is compatible with the transform. Considering a transform matrix $O_{2^M}$ with size $2^M \times 2^M$ such that $2^{M-1} < N \le 2^M$, the vector p requires $2^M$ values to be compatible with O. This means that $2^M - N$ values must be included in such a padded vector. The repetition vector can be represented as:

$$p = \begin{bmatrix} I_N \\ L_{2^M - N} \end{bmatrix} \times v$$

where all rows from $L_{2^M-N}$ are equal to the last row of $I_N$.

In this case, the transform of v using O can be expressed as:

$$\hat{t} = O \times p = O \times \begin{bmatrix} I_N \\ L_{2^M-N} \end{bmatrix} \times v$$

So, the resulting $\hat{t}$ has size $2^M$. If the inverse is to be obtained without losses, all the $2^M$ transformed views must be transmitted to the decoder. To avoid sending the extra information due to padding, and thus reducing the coding efficiency by increasing the rate, a possible approach is to discard the extra $K=2^M-N$ attributes, transmitting only the original number of plenoptic attributes N. In such a case, considering $\hat{t}'$ as transformed vector $\hat{t}$ with the $2^M-N$ last values discarded, the decoding operation may rely on zero padding to ensure that $\hat{t}'$ is compatible with the inverse transform $O^{-1}$. Using this method causes error in the decoded views because $v=v'$ if, and only if, the last $2^M-N$ values from $\hat{t}$ were equal to 0. In all the other cases $v \neq v'$, therefore there are errors ($e=v-v' \neq 0$). This means that this approach also hurts the coding efficiency, this time on the distortion since the reconstruction will not be perfect due to the missing information discarded by the encoder.

This invention brings as solution a method that includes a transform with size N on the encoder and N or $2^M$ on the decoder such that the inverse is perfect, assuming that $t'=t$. In the case where the encoder uses N sized transform and the decoder uses $2^M$, the inverse transform matrix cannot be obtained by the forward transform matrix, making the present invention different from the prior art illustrated in FIG. 3.

Figure 4:
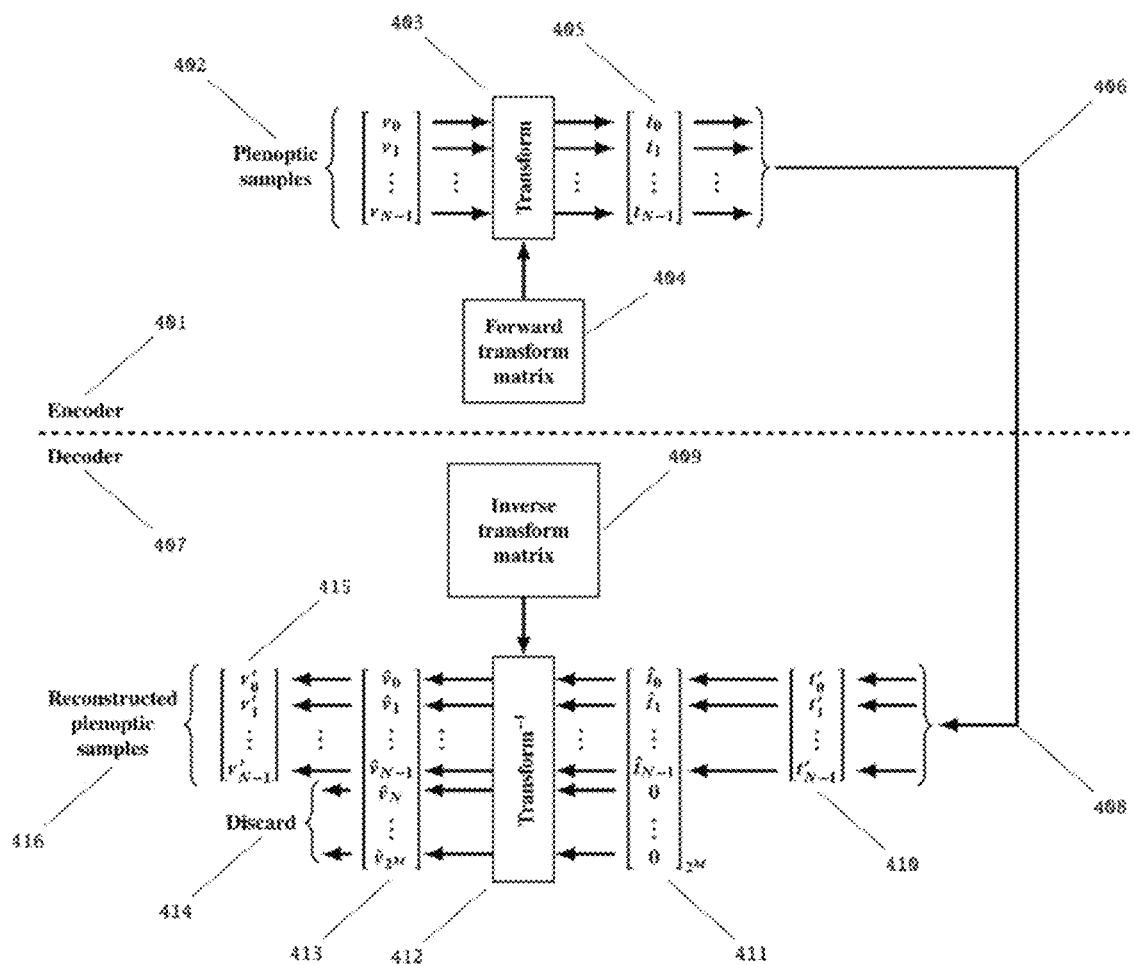
FIG. 4 represents the method for performing the direct and inverse 1D transform according to an embodiment.

FIG. 4 represents the transform flow from the present invention. On the encoder side (401), each plenoptic samples vector v (402) is transformed (403) using a specific forward matrix (404) to obtain the transformed vector t (405). The remaining encoding operations (406) from the Plenoptic Attributes Encoder are performed on the transformed views to create the binary file that is somehow sent to a decoder (407). After the initial decoding operations (408), the transform is to be computed. However, to have a small complexity, the decoder only has powers of two transforms available (409), i.e., the transform matrices are in the form $O_{2^M}$. When the received vector t' (410) size is not compatible with the available transforms, K zeros are padded to the end of t' forming vector $\hat{t}$ (411). The transform (412) proceeds using $O_{2^M}$ and $\hat{t}$, generating vector $\hat{v}$ (413). As the original point cloud had N views, the last K values from vector v' are discarded (414), generating the decoded vector v' (415). The reconstructed plenoptic samples (416) are forwarded to the next steps of decoding. Assuming that $t'=t$ and that the inverse and forward matrices are designed as presented in the next paragraphs, then $v'=v$.

To arrive at this asymmetry, it is possible to depart from a known forward power of two sized transform ($F_{2^M}$), to define an arbitrary forward matrix ($M_N$), such that $v=v'$ when considering the transform using $M_N$, padding with zeros, performing the inverse with $(F_{2^M})^{-1}$ and then discarding the last K values from the result, i.e.:

$$v' = [\underbrace{I_{2^M} \quad 0_{M \times K}}_{Discarding}] \times (F_{2^M})^{-1} \times \begin{bmatrix} I_{2^M} \\ 0_{K \times 2^M} \end{bmatrix}^{Padding} \times M_N \times \underbrace{v}_{t'=t}$$

To ensure that $v'=v$, the following equation must be true:

$$[I \quad 0] \times (F_{2^M})^{-1} \times \begin{bmatrix} I \\ 0 \end{bmatrix} \times M_N = I_N$$

For the above equation to hold, $$\left([I \quad 0] \times (F_{2^M})^{-1} \times \begin{bmatrix} I \\ 0 \end{bmatrix}\right)$$

must be equal to $(M_N)^{-1}$ since $(M_N)^{-1} \times M_N = I_N$. Thus, it is possible to obtain $M_N$ for any value of $N < 2^M$ as $$M_N = \left([I \quad 0] \times (F_{2^M})^{-1} \times \begin{bmatrix} I \\ 0 \end{bmatrix}\right)^{-1}.$$

If such forward matrix $M_N$ can be found, it can be used in the encoder to avoid transmitting padding while allowing the decoder to use $(F_{2^M})^{-1}$ to perfectly reconstruct the original vector v using zero padding (only on the decoder). In short, the forward transform matrix is obtained by the inverse of the multiplication of the discard matrix by the inverse transform matrix multiplied by the padding matrix.

In the article "Arbitrarily Shaped Transform Coding Based on a New Padding Technique", a method was proposed to perform the forward floating-point transform with arbitrary size, being an optimal padding technique for the 1D transform. In this case, the values can be discarded without loss of information, as mentioned earlier. The proposal shows that the padded values could be interlaced in the input vector to minimize the energy of the coefficients after the transform, helping the compression. Additionally, for each shape N and a known direct transform $O_{2^M}$, a floating-point direct matrix with size $M_N$ may exist to be used in the encoder such that the inverse transform uses $(O_{2^M})^{-1}$. The results presented in the article consider 2D floating-point DCT. Although this solves arbitrary size transforms in the decoder while also avoiding the need for padding in the encoder, it still requires using floating-point transform in the decoder.

In this invention, power of two sized transform with integer transform coefficients may be adopted on the decoder side, while an arbitrary size floating-point transform may be adopted on the encoder side. In this case, by using an appropriate scaling, the optimal padding approach may be used in the encoder with arbitrary size floating-point transform. This ensures that the decoder has a small complexity (using integer inverse transform) and reduces the number of available sizes (only powers of two), thus reducing the area demands if the decoder is embedded in a hardware accelerator.

Given that the optimal padding may be interlaced on the input, the decoder must perform the de-interlacing. The inverse transform matrix may be pre-multiplied by a permutation matrix such that after the inverse transform operation, the "decoded" padded values are by the end of the decoded vector, avoiding extra operations. Then, the last K values can be discarded without information loss. This case is represented in FIG. 4, where the forward transform matrix (404) is of arbitrary size N, while the inverse transform matrix (409) has power of two size and may be pre-multiplied by a permutation matrix. On the other hand, it is possible to perform the reordering after the transform for every padded decoded vector.

A final option is using an arbitrary size integer or fixed-point transform to address only the issue with floating-point operations. In this case, the plenoptic attributes codec is the same, and the resulting complexity will depend on the used coefficients. On the other hand, while this approach does not solve the issue of having arbitrary sizes transform, it also does not have the problem of requiring padding and dealing with coding efficiency reduction by discarding padded values.

Figure 5:
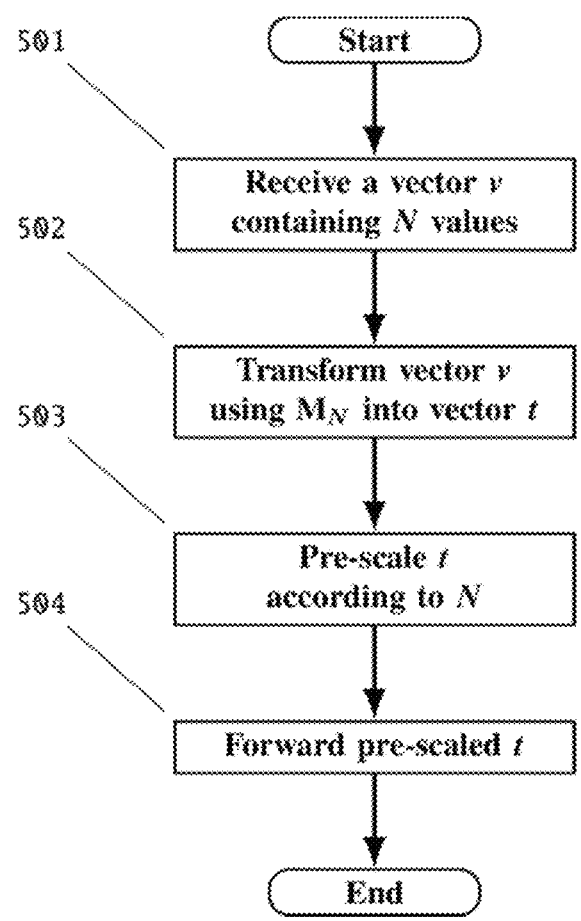
FIG. 5 illustrates the proposed direct transform flow according to an embodiment.

In all three cases, there is no need for padding to be actually performed on the encoder side, thus no extra information is sent to the decoder. This also means that no information is lost by discarding padded values on the encoder. FIG. 5 illustrates the forward transform flow proposed in this invention. First, a vector v with N input values is received (501). Such a vector is transformed using the forward transform matrix $M_N$, that can be floating-point, a fixed-point approximation, or an integer transform matrix (502). If the transform is integer, a scaling by a floating- or fixed-point constant may be necessary (503). The scaled transformed vector is then sent (504) to the next steps of the Plenoptic Attributes Encoder.

Figure 6:
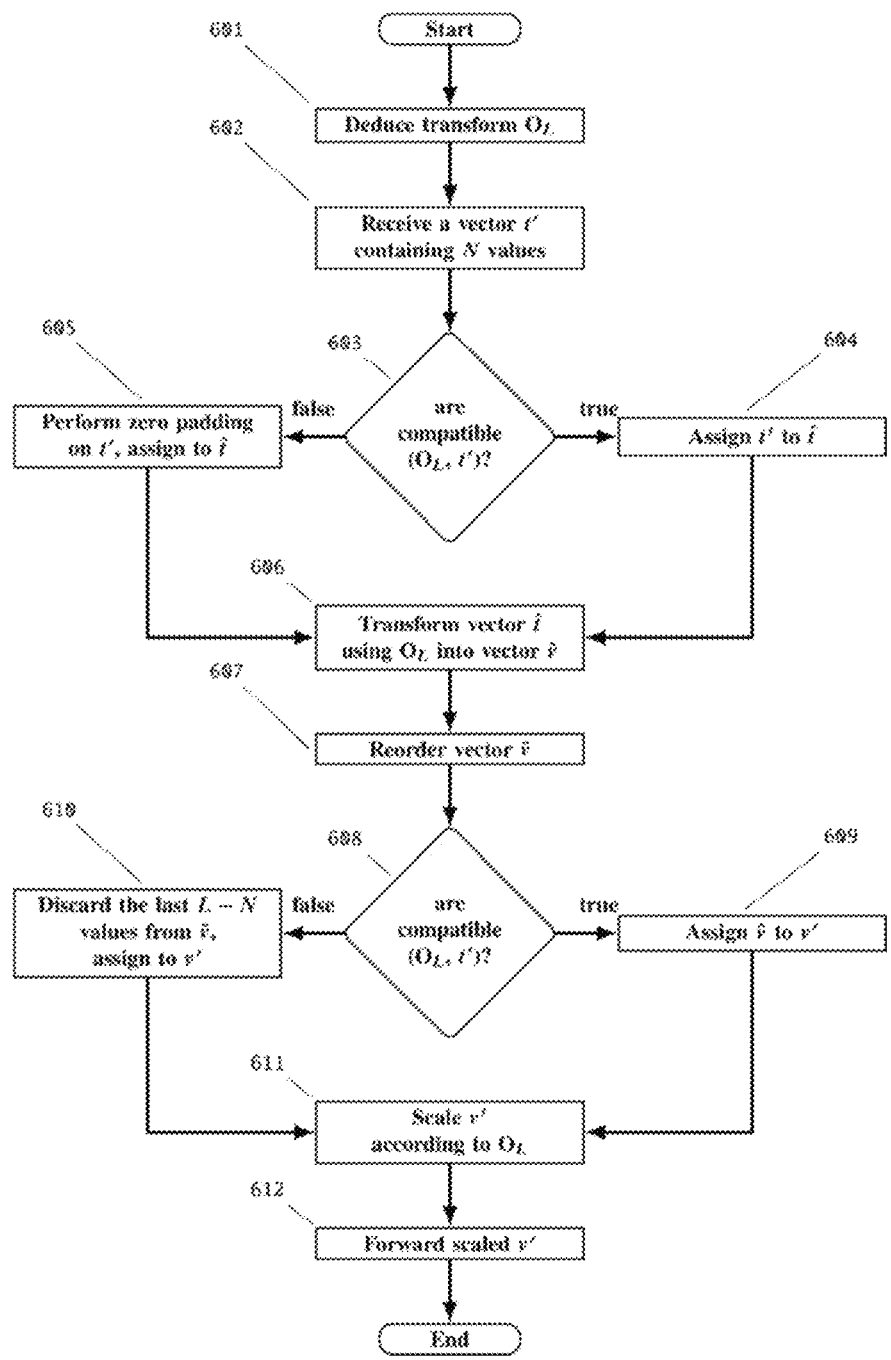
FIG. 6 illustrates the proposed inverse transform flow according to an embodiment.

FIG. 6 illustrates the inverse transform flow proposed in this invention. The decoder must know the inverse matrix transform $O_L$ somehow (601), where L≥N. Such information may be signalized in the bitstream using an implicit definition from levels and/or profiles in a standard or other method. The vector t' with N values is obtained (602). The decoder then verifies if the inverse transform is compatible with vector t' (603). If t' is compatible with the inverse transform matrix, then t is assigned to vector $\hat{t}$ (604). Otherwise, if t' is not compatible, then zero padding is performed over t' and the result is assigned to $\hat{t}$ (605). Vector $\hat{t}$ is then transformed (606) using the inverse matrix, resulting in $\hat{v}'$. If a reorder is necessary and it was not already accounted for in the inverse transform matrix, $\hat{v}'$ is reordered (607). Considering that the reorder was already performed, this step can be skipped, or the identity matrix (I) may be used as permutation matrix. The decoder then verifies again if the inverse transform was compatible with vector t (608). If true, $\hat{v}'$ is assigned to v' (609), otherwise the last K=L−N values of $\hat{v}'$ may be discarded (610), resulting in vector v'. As in the encoder, a scaling by a floating- or fixed-point value may be necessary (611). Finally, the resulting vector is forwarded to the remaining steps of the plenoptic attributes decoding (612).

The well-known Hadamard transform is a strong candidate to ensure the minimum number of operations in the transform. The Hadamard matrices have sizes that are powers of two by definition. Also, the values in the Hadamard matrix are always +1 or −1. Thus, no multiplication is needed. Moreover, the optimal method to compute the Hadamard transform using only N×log$_2$N operations is well known in the art, and thus making such a transform the best candidate to allow low-complexity view transform.

The Hadamard matrix may have different orderings. The order obtained by the recursive construction is known as the natural ordered Hadamard matrix. The recursive construction is as follows:

$$H_2 = \begin{bmatrix} 1 & 1 \\ 1 & -1 \end{bmatrix}$$

$$H_{2^M} = H_2 \otimes H_{2^{M-1}}$$

Assuming a forward transform matrix $F_{2^M}=H_{2^M}$, and thus $(F_{2^M})^{-1}=H_{2^M}$, a set of forward transform matrices can be obtained when $N \neq 2^M$, $\forall M \in \mathbb{N}$, with $K=2^M-N$, such that:

$$M_N = \left( [I \ 0] \times H_{2^M} \times \begin{bmatrix} I \\ 0 \end{bmatrix} \right)^{-1}$$

Figure 7:
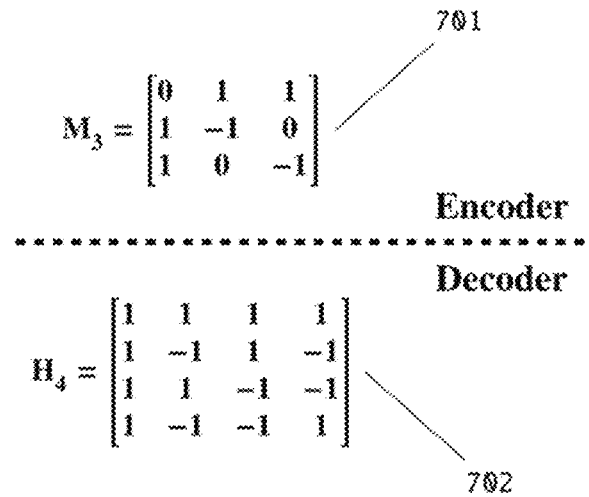
FIG. 7 shows the adapted Hadamard transform matrix used for the case where the next power of two is 4 according to an embodiment.
Figure 8:
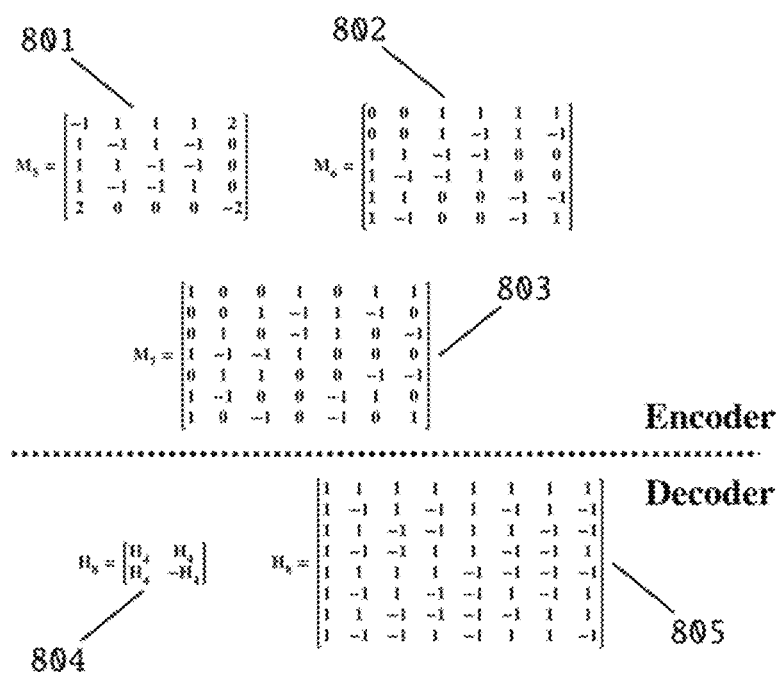
FIG. 8 shows the adapted Hadamard transform matrices used for the case where the next power of 2 is 8 according to an embodiment.
Figure 9:
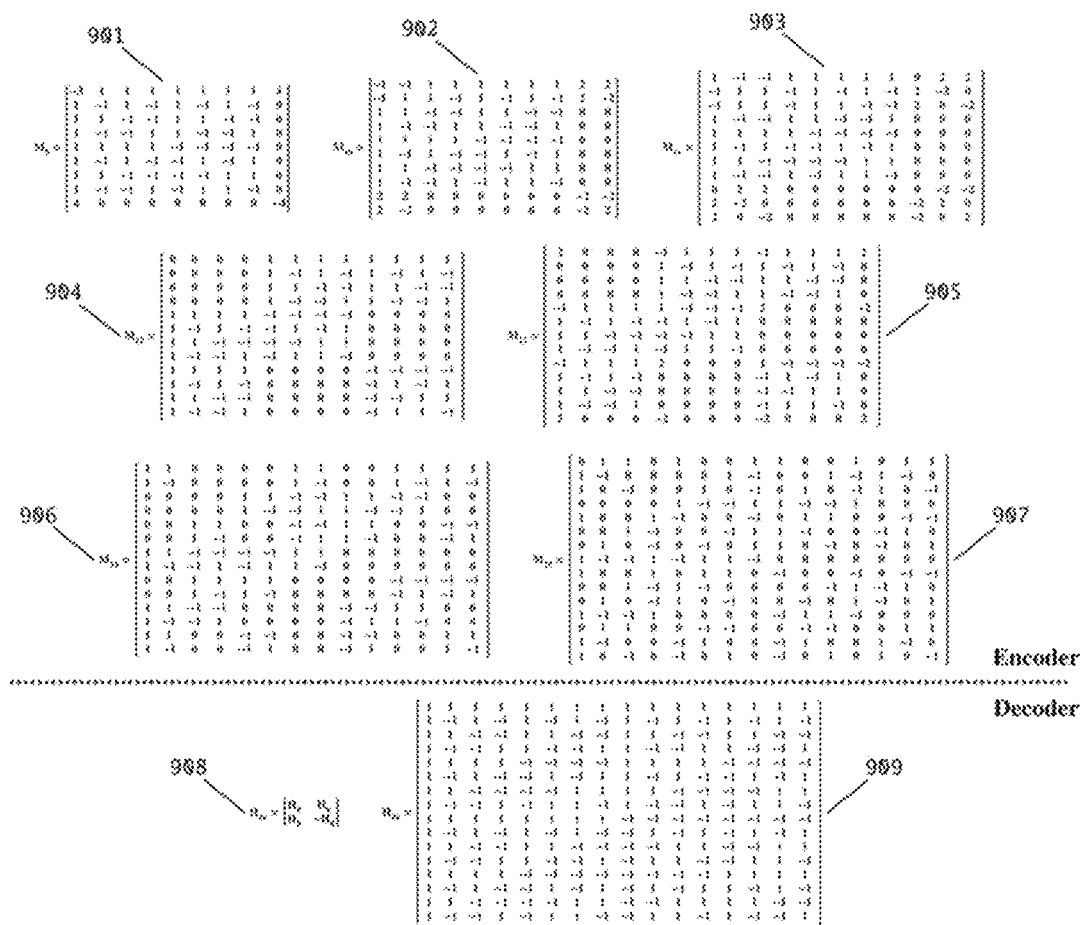
FIG. 9 shows the seven adapted Hadamard matrices for the case where the next power of two is 16 according to an embodiment.

FIGS. 7 to 9 show the obtained $M_N$ considering $2^M$=4,8, 16. Other sizes for N>16 can be obtained considering the above equation. FIG. 7 shows the used transform matrix for the case where the next power of two is 4. There is only one case, i.e., for N=3 the encoder uses $M_3$ (701), while the decoder uses $H_4$ (702), considering zero padding on the input vector (213)

FIG. 8 shows the used transform matrices for the case where the next power of two is 8. On the encoder side, for N=5 the encoder uses $M_5$ (801), for N=6 the encoder uses $M_6$ (802), and for N=7 the encoder uses $M_7$ (803). On the other hand, in all these cases the decoder uses $H_8$ (804), considering zero padding on the input vector (213). As the $H_8$ is in natural order, it was obtained recursively (805) from $H_4$ (702).

FIG. 9 shows the seven adapted Hadamard matrices for the case where the next power of two is 16. On the encoder side, for N=9 the encoder uses $M_9$ (901), for N=10 the encoder uses $M_{10}$ (902), for N=11 the encoder uses $M_{11}$ (903), for N=12 the encoder uses $M_{12}$ (904), for N=13 the encoder uses $M_{13}$ (905), for N=14 the encoder uses $M_{14}$ (906), and for N=15 the encoder uses $M_{15}$ (907). On the other hand, in all these cases the decoder uses $H_{16}$ (908), considering zero padding on the input vector (213). As the $H_{16}$ is in natural order, it can be obtained recursively (909) from $H_8$ (805).

Figure 10:
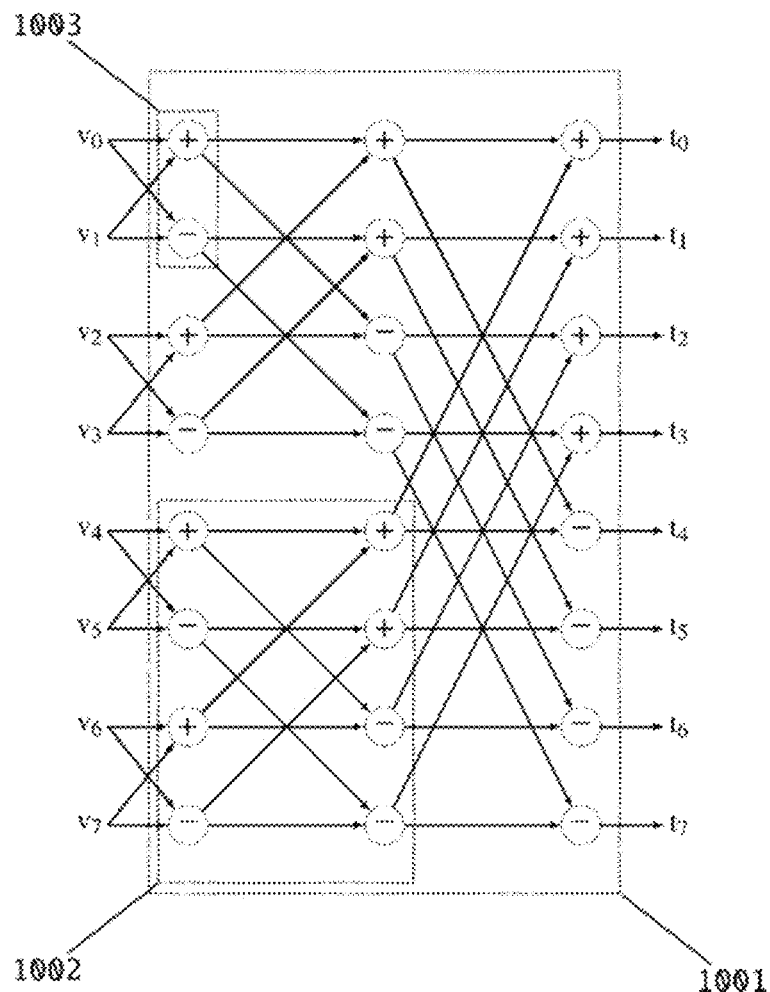
FIG. 10 illustrates the datapath of the Hadamard 1D transform with size eight according to an embodiment.

The Hadamard matrix in its natural order is also important because such a recursive construction allows for very efficient hardware architectures where small transforms can be computed using the same hardware already present in the larger transforms. FIG. 10 shows how simple is such an architecture for $H_8$ (1001). Because the recursive construction of the transform matrix, such datapath contains also datapaths to compute the transform with $H_4$ (1002) and with $H_2$ (1003).

Therefore, this realization has the lowest possible transform cost. Its energy requirements are small, since there are only a few operations and no transform coefficient to be multiplied. In addition, the hardware is recursive in nature (FIG. 10), and thus occupies a small area of silicon if embedded in a System-on-Chip (SoC) since a circuit that implements a certain size includes the circuit to run in parallel all the smaller sizes that precede it.

Figure 11:
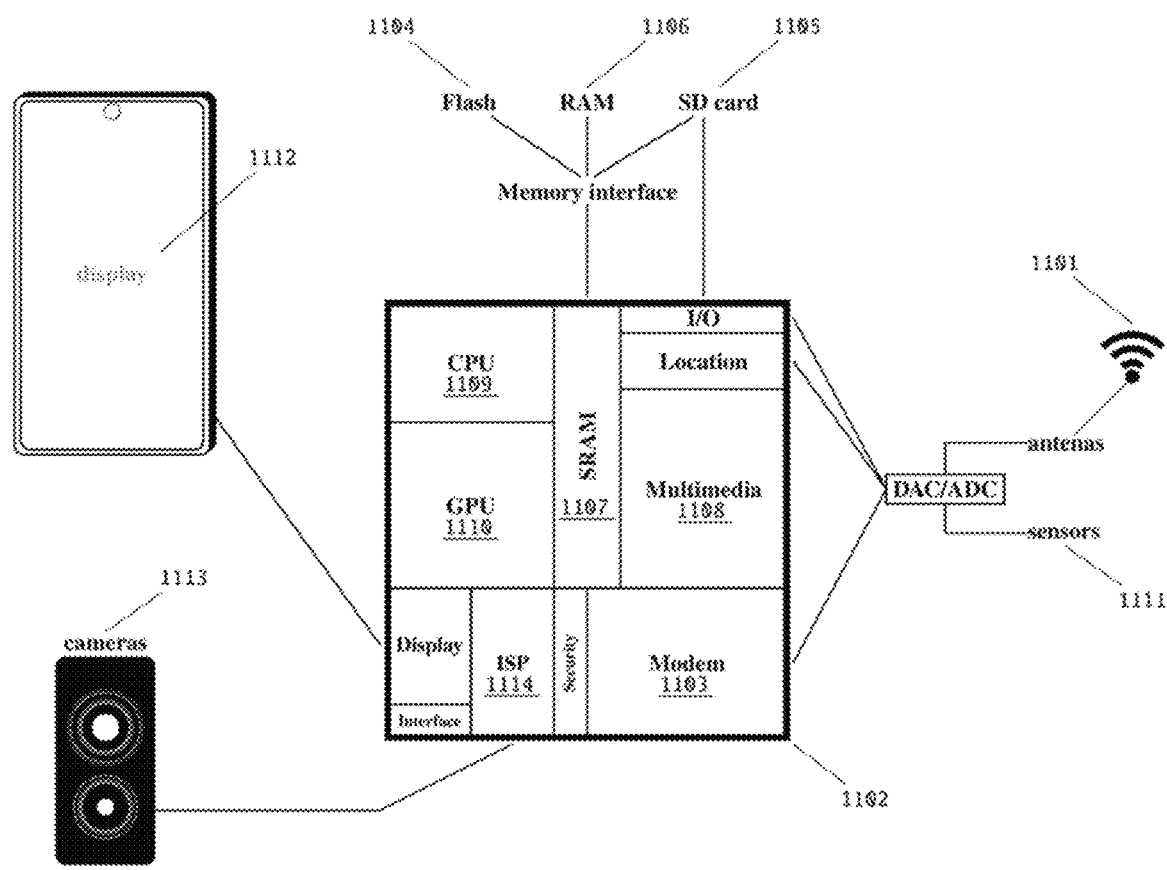
FIG. 11 shows an example of a mobile SoC and some of its interfaces according to an embodiment.

FIG. 11 shows an example of a mobile SoC and some of its interfaces. A plenoptic point cloud bitstream can be received through the network antenna (1101), and then processed in the mobile SoC (1102) initially by the Modem subsystem (1103), and then stored in the flash memory of the device (1104), SD card (1105) or loaded directly into the main random access memory system (RAM) (1106) for on-demand decoding. The memory subsystem, containing an on-chip SRAM module (1107), makes bitstream data available to the whole SoC. To decode each attribute sub-bitstream (205), the mobile SoC (1102) can have an HEVC decoder built into multimedia IP (1108). After reverse scaling (208) and zero-padding (213), the inverse transform (209) can operate as software loaded to the CPU (1109) or GPU (1110) or even be embedded as a hardware accelerator synthesized within the multimedia IP (1108). Unused views should be discarded (214) and the other views can be displayed on a plenoptic screen. Even without a plenoptic screen, a device equipped with a plenoptic point clouds decoder may be able to simulate the different viewing angles using data from the device's sensors (1111), such as gyroscopes and/or accelerometer. According to motion sensor detection, the display (1112) can show colors related to a specific view. The speed at which the device can decode plenoptic point clouds will play an important role in ensuring the realism of the displayed media.

Given the low complexity of the proposed embodiment, the encoder can also be embedded into a SoC. A camera with multiple lenses (1113) and some depth sensing methods may capture different views of a point cloud. The image data will be processed by the Image Signal Processor (ISP) (1114) and can be rendered into a point cloud. Then, a plenoptic point cloud encoder can be loaded on the CPU (1109), GPU (1110) or be enabled on the multimedia IP (1108).

As a second embodiment, it is considered the case where the encoder adopts a floating-point 1D DCT transform with optimal padding, which can be implemented as an arbitrary-sized floating-point DCT on the encoder side. However, as explained, changing the position of the padding values can improve the efficiency of transform encoding, and therefore the inverse transform must be reordered. In addition, an integer transform can be a sufficient approximation of the floating-point DCT in the decoder. In this embodiment, as an integer transform, the inverse DCT of the HEVC is adopted for sizes 4, 8 and 16. Thus, the values must be scaled by $1.0/(64 \times \sqrt{2^M})$.

In the case of this embodiment, the hardware design of the reverse DCT of a HEVC IP Core can be partially reused, given the necessary modifications to operate only in one dimension. During the modification, the transform coefficients can be reordered. Of course, a person skilled in the art may be able to perform reordering (shift) on the decoded vector v', rather than making the shifts over the transform matrix.

Figure 12:
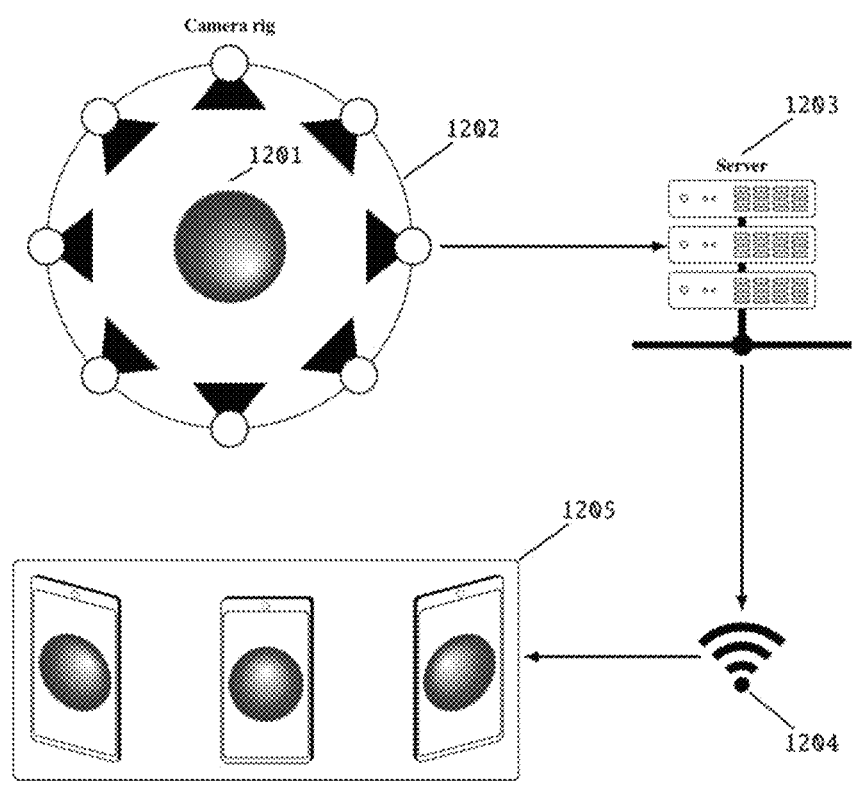
FIG. 12 illustrates an embodiment of point cloud capture and visualization according to an embodiment.

This embodiment has small complexity on the decoder (integer and power of two sized transform), whereas keeps a considerable complexity at the encoder side (floating-point arbitrary size transform). FIG. 12 shows one possible use of this embodiment, that is for content creators and distributors with powerful processing capabilities that wish to adopt plenoptic point clouds, paying the larger complexity burden on their side (encoding) while alleviating the load on the clients' side (decoding) which may be on mobile devices. Some content (1201) is captured via a camera array (1202). A powerful server (1203) or workstation will be able to represent the captured content by means of a plenoptic point cloud and encode it to distribution using the Plenoptic Attributes Encoder. Such encoder may execute on CPU or even on FPGA accelerators integrated on modern servers. The encoded plenoptic point cloud is transmitted though the network (1204) to be decoded and displayed by mobile devices (1205) with relatively low complexity because of the adopted integer inverse transform.

Figure 13:
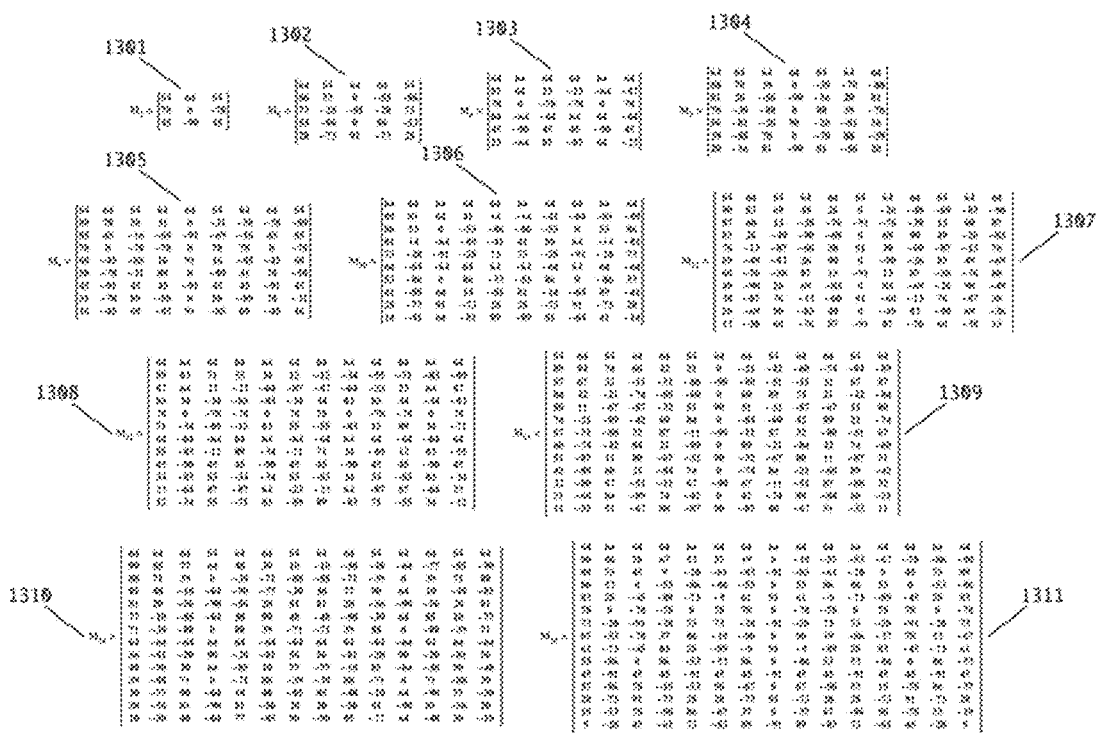
FIG. 13 illustrates integer DCT matrices for sizes up to 15 according to an embodiment.

A third embodiment of this invention addresses only the issue of having floating-point operations in the transform. For this, fixed point can be used (because it can be implemented as an integer representation). However, integer DCT approximations can also be used. FIG. 13 shows integer approximations constructed following the same principles as the integer HEVC DCT. However, they do not consist of the same transform used in HEVC, because for that standard, the transform is only defined for power of two sizes, being 4, 8, 16, and 32.

Considering a case where the number of views N=3, $M_3$ (1301) will be used both on the encoder and on the decoder. However, for decoding the transpose of $M_3$ is used. Similarly, for N=5, $M_5$ (1302) is used on the encoder and $M_5^T$ is used on the decoder. For sizes N={6,7,9,10,11,12,13,14,15}, the transform matrices are $M_6$ (1303), $M_7$ (1304), $M_9$ (1305), $M_{10}$ (1306), $M_{11}$ (1307), $M_{12}$ (1308), $M_{13}$ (1309), $M_{14}$ (1310), and $M_{15}$ (1311), respectively.

The same strategy can be adopted to design integer transforms to sizes larger than N=15. Also, when the number of views is a power of two, the HEVC DCT can be used. There are 61 distinct coefficients, disregarding their signal, considering the 11 matrices in FIG. 13 together with the HEVC DCT for sizes 4, 8 and 16. The disadvantage of this embodiment is that it still requires a specific transform matrix for each number of plenoptic views. While this avoids the need for any padding strategy, it is expensive to manufacture a solution with a dedicated hardware IP for this embodiment. However, it is still a valid approach that is based on the integer arithmetic that can be accelerated into software (SIMD or GPU). In addition, if, during a specific period, content with a certain number of views is more likely to be adopted, a good solution would be to create a prototype of the transform for such a size in an FPGA. The advantage of this solution is that its coding efficiency is equivalent to that of arbitrary-sized floating-point DCT, while the efficiency of the FPGA will be better than performing the transform on general purpose devices (CPU/GPU).

The present invention proposes alternative transform methods that can be adopted considering the tradeoff between coding efficiency and complexity. One advantage of having some alternatives with different coding efficiencies versus complexity is that they can be related to specific levels (of complexity) determined by an international standard. To show the effects of the three embodiments of this invention, first an analysis of coding efficiency is provided, then a complexity analysis is provided using energy efficiency estimates and, finally, cost-benefit results are provided.

To evaluate the coding efficiency, three embodiments of this invention and five transforms were implemented considering the state of the art in TMC2v11.0:

"Prior art DCT (fp, N)" uses arbitrary size floating-point DCT on both encoder and decoder.

"Prior art DCT op (fp, N and $2^M$)" uses arbitrary size adapted floating-point DCTs on the encoder and power of two sized floating-point DCT on the decoder.

"Prior art DCT (fp, $2^M$)" uses power of two sized floating-point DCTs on both encoder and decoder.

"Prior art HEVC DCT (i, $2^M$)" uses the power of two sized integer DCT from HEVC on both encoder and decoder.

"Prior art Hadamard (i, $2^M$)" uses the Hadamard transform on both encoder and decoder. Such a transform is integer and power of two sized by definition.

Thus, "Prior art DCT (fp, $2^M$)", "Prior art HEVC DCT (i, $2^M$)", and "Prior art Hadamard (i, $2^M$)" need padding because the transform is not compatible with the tested point clouds. In these cases, repetition padding (of the last valid view) was adopted in the encoder, and because the transformed padded views are discarded on the encoder, the decoder uses zero-padding.

In relation to the embodiments of this invention, in summary:

"This invention, embodiment 1" uses arbitrary size adapted Hadamard matrices in the encoder and natural ordered Hadamard matrices in the decoder;

"This invention, embodiment 2" uses arbitrary size adapted floating-point DCT on the encoder and integer HEVC DCT on the decoder;

"This invention, embodiment 3" uses, in both encoder and decoder, integer DCT of arbitrary size built using the same method for matrices of size in powers of two of the HEVC DCT.

Table 2 summarizes the tested transforms and their characteristics. In these tests, the encoder was configured with the default TMC2 parameter values of the C2-AI configuration, and the plenoptic attribute encoder was configured so that each attribute image was encoded with QP=$QP_{main}$. The different transforms were tested over the Longdress, RedAndBlack, and Soldier point clouds from the original 8i Voxelized Surface Light Fields (VSLF) dataset, which uses 12-bit precision geometry.

TABLE 2

| Name | Arithmetic | Size |
|---|---|---|
| Prior art DCT (fp, N) | floating-point | N |
| Prior art DCT op (fp, N and $2^M$) | floating-point | N (encoder) and $2^M$ (decoder) |
| Prior art DCT (fp, $2^M$) | floating-point | $2^M$ |
| Prior art HEVC DCT (i, $2^M$) | integer | $2^M$ |
| Prior art Hadamard (i, $2^M$) | integer | $2^M$ |
| This invention, embodiment 1 | integer | N (encoder) and $2^M$ (decoder) |
| This invention, embodiment 2 | floating-point (encoder) and integer (decoder) | N (encoder) and $2^M$ (decoder) |
| This invention, embodiment 3 | integer | N |

Figure 14:
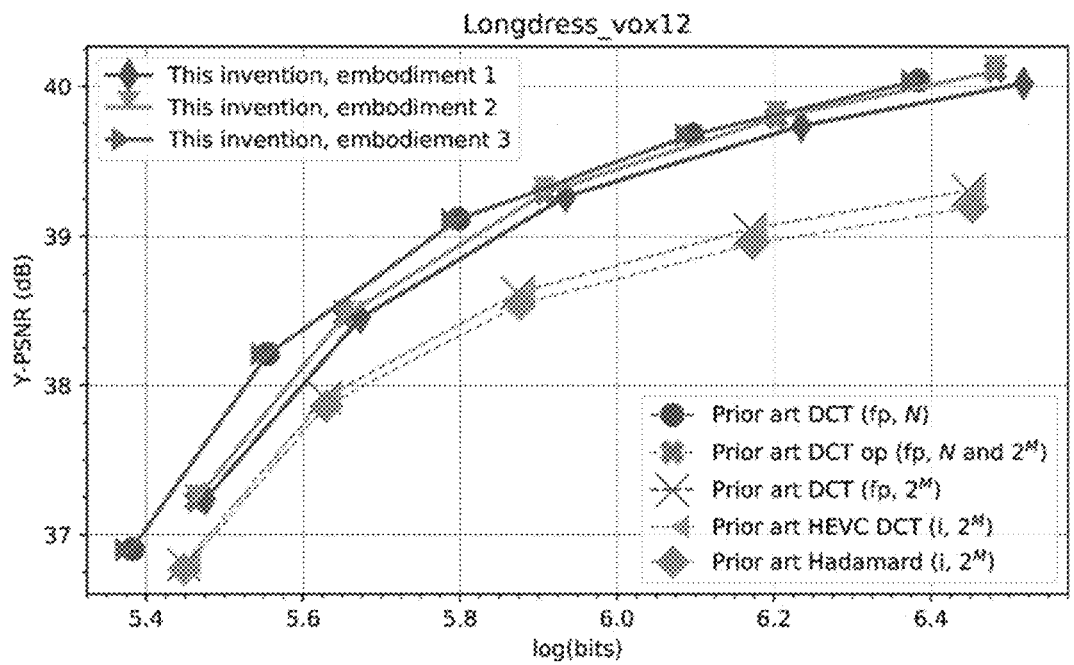
FIGS. 14, 15 and 16 present graphs of the rate-distortion curves for the Longdress, RedAndBlack, and Soldier point clouds, respectively, according to an embodiment.
Figure 15:
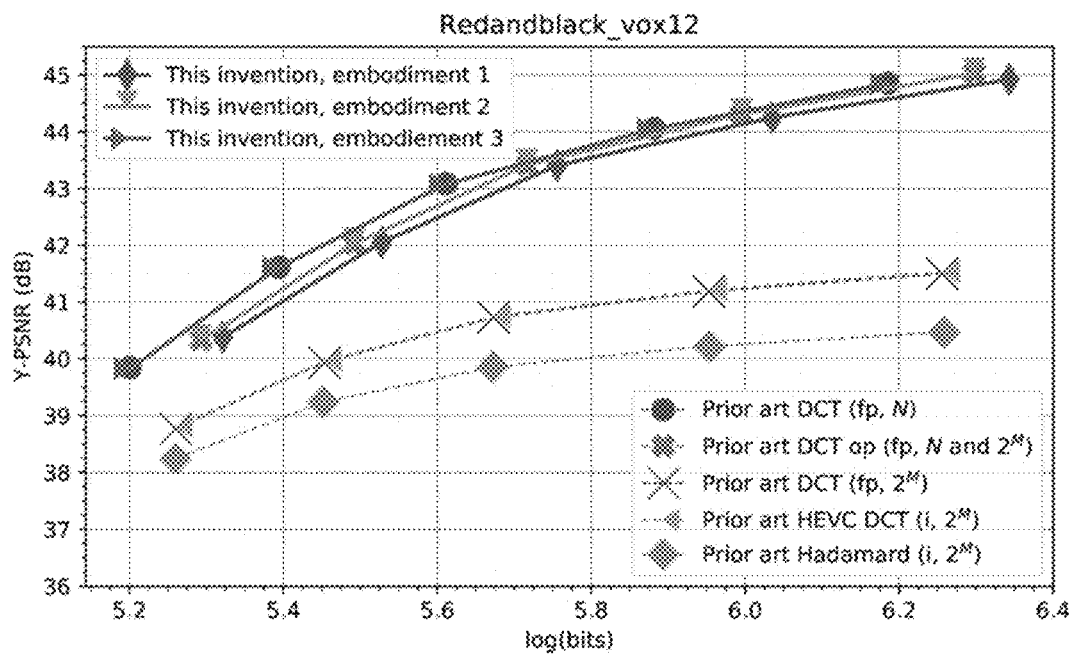
Figure 16:
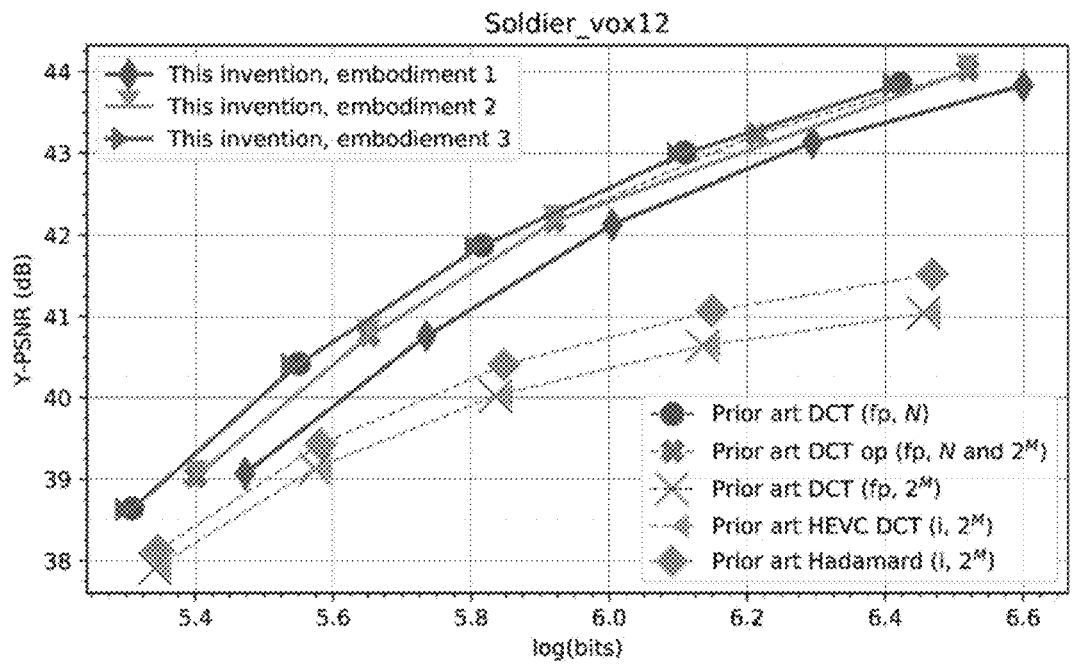

By itself, coding efficiency is a tradeoff between rate and distortion. The rate was calculated considering the bit rates of all views (main and plenoptic). The lower the rate, the better. The distortion was calculated as the Peak Signal-To-Noise Ratio (PSNR) of the Y channel between the original and decoded point clouds, all taken as a single signal instead of a PSNR average between views. The higher the PSNR, the better (less noise). One way to assess coding efficiency is through rate-distortion curves, which are presented in FIGS. 14 through 16, for the Longdress, RedAndBlack, and Soldier point clouds, respectively.

Table 3 shows the BD-rates of each transform in relation to multiple attribute encoding (when no transform is used). For these BD-rate values, the lower the value, the better. It is possible to note that embodiment 3 has no loss in coding efficiency compared to the state of the art using arbitrary size floating-point DCT. In addition, there is no loss in the coding efficiency of embodiment 2 in relation to the state of the art using optimal padding, thus showing that the integer transforms with limited sizes from HEVC in the decoder do not affect the coding efficiency. Finally, while embodiment 1 has a small reduction in coding efficiency compared to the other two embodiments, its coding efficiency is still better than those presented in the low complexity approaches from the state of the art using transforms with size $2^M$ in both encoder and decoder and requiring padding.

TABLE 3

| Transform | Longdress | RedAndBlack | Soldier |
|---|---|---|---|
| Prior art DCT (fp, N) | −89.37 | −83.54 | −78.49 |
| Prior art DCT op (fp, N and $2^M$) | −88.23 | −81.9 | −75.78 |
| Prior art DCT (fp, $2^M$) | −83.78 | −64.4 | −63.96 |
| Prior art HEVC DCT (i, $2^M$) | −83.81 | −64.54 | −63.9 |
| Prior art Hadamard (i, $2^M$) | −83.28 | −57.86 | −65.77 |
| This invention, embodiment 1 | −87.48 | −80.38 | −70.18 |
| This invention, embodiment 2 | −88.23 | −81.88 | −75.74 |
| This invention, embodiment 3 | −89.38 | −83.51 | −78.46 |

Considering a system where alternative methods are implemented in hardware, one way to evaluate the complexity of each method is by its energy efficiency. To estimate the energy efficiency of each method, the estimates provided in Table 1 were used. Energy efficiency estimates are obtained considering the number of operations required to calculate the transform over one sample.

Figure 17:
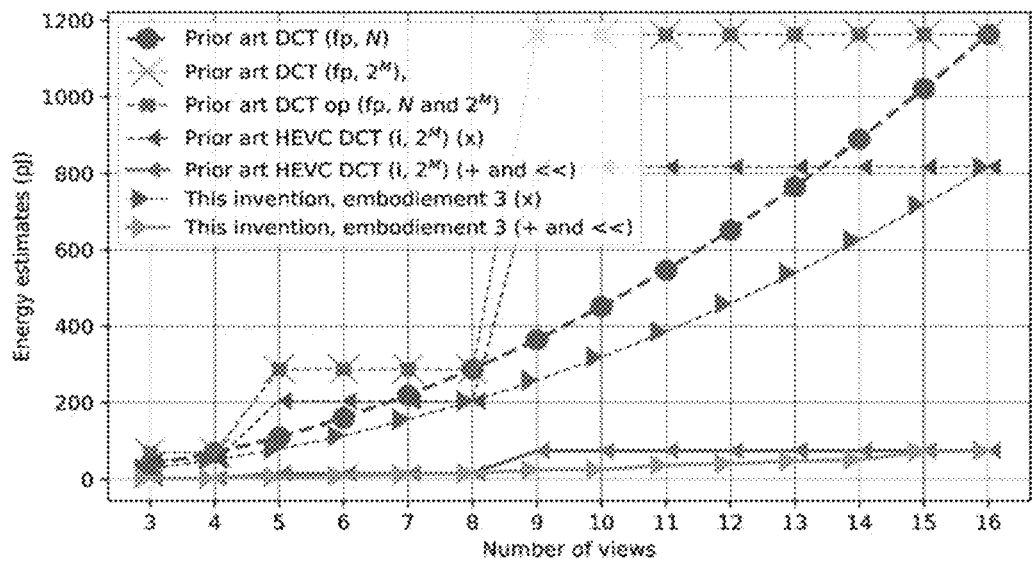
FIG. 17 illustrates energy estimates according to the number of views, considering integer and floating-point transforms with multiplications and additions and shifts according to an embodiment.

First, to demonstrate that integer arithmetic is preferred over floating-point arithmetic, the energy estimates of the floating-point transforms were compared with "Prior art HEVC DCT (i, $2^M$)" and "This invention, embodiment 3". Moreover, to show that integer constant multiplication can be more efficiently performed by additions and shifts, the included integer transforms were compared with both implementations, i.e., using multipliers (×) or using additions and shifts (+and <<). FIG. 17 shows the results. When using arbitrary sizes, the energy increases according to the number of views, i.e., the transform size. When using power of two sizes, the energy increases earlier since it requires the use of the next larger power of two transform size. Comparing "Prior art DCT (fp, $2^M$)" with "Prior art HEVC DCT (i, $2^M$)" (using ×), it is possible to see that an equivalent integer transform is more energy-efficient than its floating-point counterpart. But the largest differences are when comparing the adoption of × versus +and <<. "Prior art HEVC DCT (i, $2^M$)" using multiplication requires 11.16× more energy than what is required by using only additions and shifts. In the case of "This invention, embodiment 3", 10.87× more energy is required in the implementation with multipliers. By these results, it is clear that an integer or fixed-point transform is far superior in terms of energy efficiency.

Figure 18:
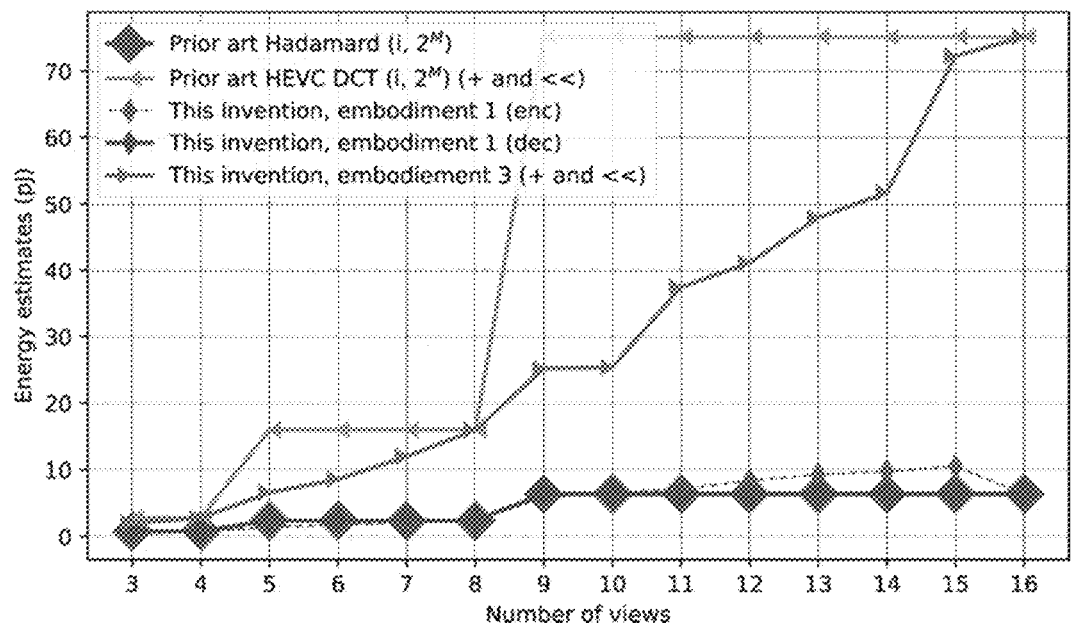
FIG. 18 shows the energy estimates of low complexity alternatives according to an embodiment.

FIG. 18 shows the energy estimates of the low-complexity alternatives, being "This invention, embodiment 1" (encoder and decoder), "This invention, embodiment 2" (decoder only), "This invention, embodiment 3" (encoder and decoder are equivalent), "Prior art HEVC DCT (i, $2^M$)", and "Prior art Hadamard (i, $2^M$)". "This invention, embodiment 2" encoder energy is similar to the "Prior art DCT (fp, N)" shown in FIG. 17. It is clear that "This invention, embodiment 1" is the best alternative in terms of energy efficiency.

Figure 19:
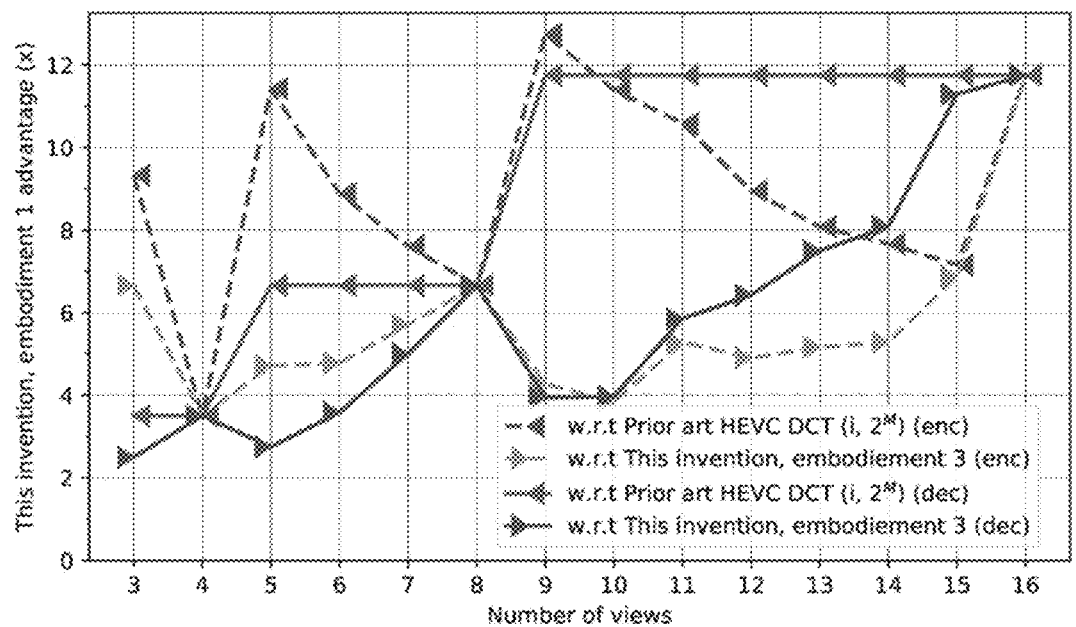
FIG. 19 presents the energy efficiency advantage over some integer alternatives according to an embodiment.

To put in evidence the energy efficiency advantage of "This invention, embodiment 1" with respect to "Prior art HEVC DCT (i, $2^M$)" and "This invention, embodiment 3", the ratio between both alternatives and "This invention, embodiment 1" were computed, both for encoder and decoder. FIG. 19 shows the obtained results. In the best case, "This invention, embodiment 1" was about 12× more energy-efficient than the "Prior art HEVC DCT (i, $2^M$)" for both encoder and decoder. In the worst case, "This invention, embodiment 1" was more than twice more energy-efficient than its counter parts. Considering the decoder, this also means that "This invention, embodiment 1" has about the same benefits compared to "This invention, embodiment 2".

Figure 20:
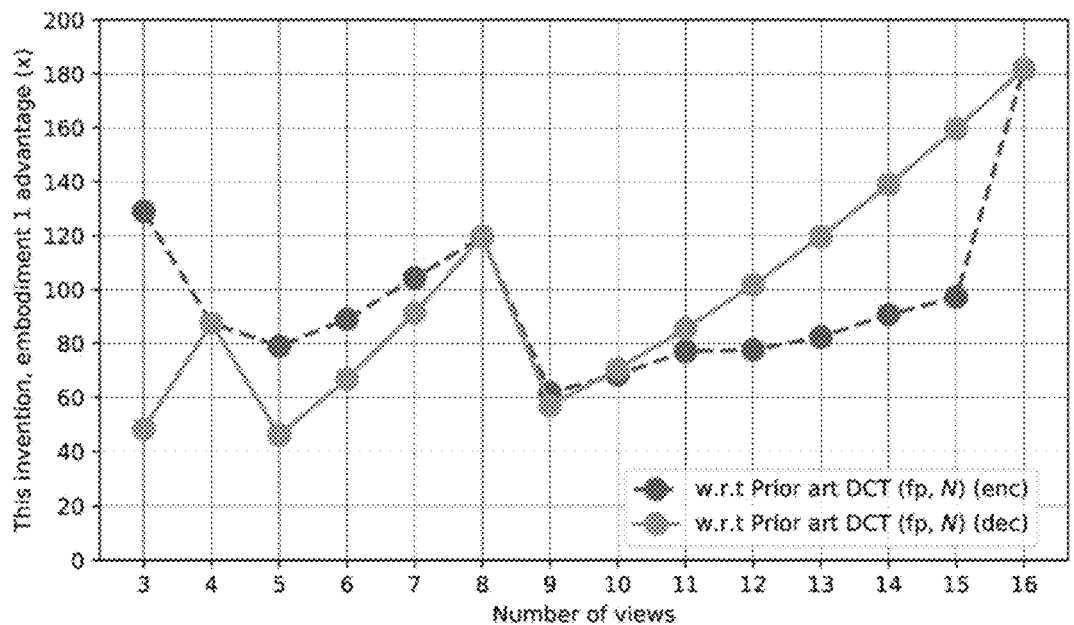
FIG. 20 presents the energy efficiency advantage over a floating-point alternative according to an embodiment.

FIG. 20 shows the improvement of adopting "This invention, embodiment 1" instead of an arbitrary size floating-point transform, such as "Prior art DCT (fp, N)". "This invention, embodiment 1" is at least 40× more energy-efficient and up to 180× more energy-efficient for the larger tested number of views. If more views are used, the differences tent to increase even more.

Figure 21:
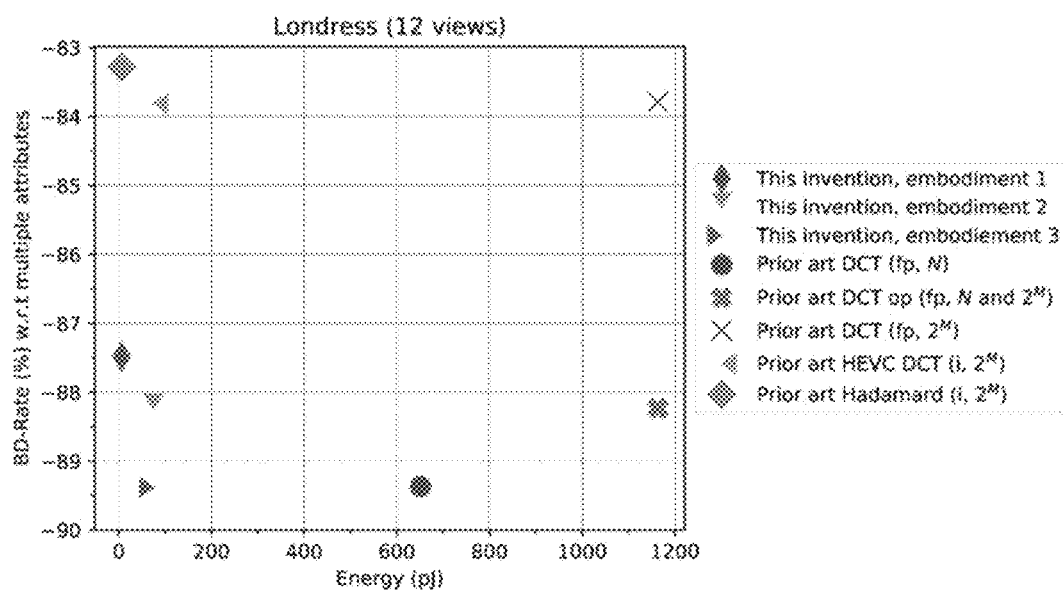
FIGS. 21, 22 and 23 show the relationship between coding efficiency and energy efficiency for Longdress, RedAndBlack, and Soldier point clouds, respectively, according to an embodiment.

FIG. 21 shows the BD-Rate (%) versus Energy (pJ) for each transform considering the Longdress point cloud. The three options that are better than the other, both in terms of coding efficiency and complexity, are the "This invention, embodiment 1", "This invention, embodiment 2" and "This invention, embodiment 3". While "Prior art DCT (fp, $2^M$)" has virtually the same BD-Rate as "This invention, embodiment 3", the latter uses much less energy than the former. Also, "Prior art DCT op (fp, N and $2^M$)" and "This invention, embodiment 2" have similar BD-Rate, but the latter also requires much less energy, but only on the decoder side. "This invention, embodiment 2" uses floating-point operations in the encoder hence requiring more energy than "This invention, embodiment 1" and "This invention, embodiment 3".

Figure 22:
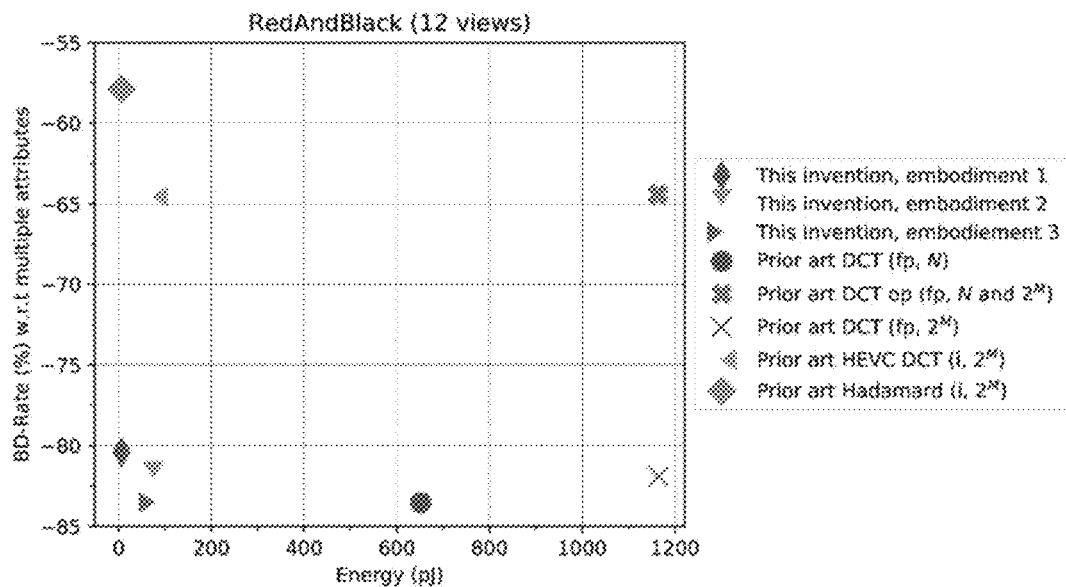
Figure 23:
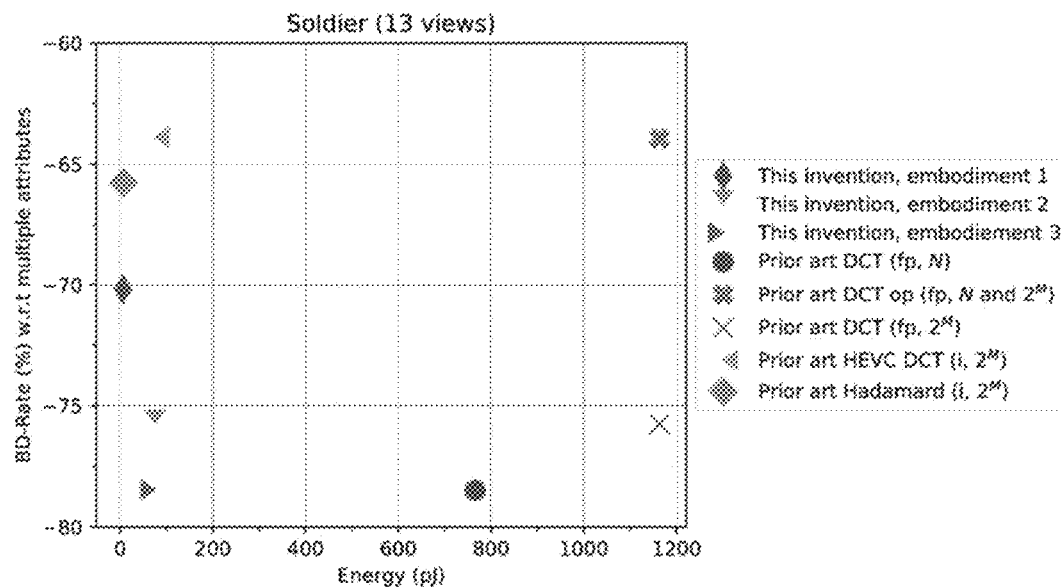

FIGS. 22 and 23 show the tradeoff results for RedAndBlack and Soldier point clouds, respectively. The results are similar to those from Longdress. A slight variation in the energy estimates occur for Soldier, since it has 13 views instead of 12 as in Longdress and RedAndBlack. Although for Soldier the coding efficiency of "This invention, embodiment 1" decreases more than on the other two point clouds, it is still better than the prior art options in a similar energy consumption level.

Although the present invention has been described in connection with certain preferential embodiments, it should be understood that it is not intended to limit disclosure to such particular embodiments. Instead, it is intended to cover all possible alternatives, modifications and equivalents within the spirit and scope of the invention, as defined by the attached claims.

What is claimed is:

1. A method of Hardware-friendly transform in codecs for plenoptic point clouds, comprising:
   obtaining plenoptic samples vector v;
   transforming the vector v from a forward matrix $M_N$;
   obtaining the transformed vector t;
   encoding the transformed vector t into a binary file and sending the encoded binary file to a decoder;
   decoding the binary file into a received vector t';
   padding the received vector t' with K zeros, to form the vector $\hat{t}$,
   performing the inverse transform with the inverse transform matrix $O_L$ in vector $\hat{t}$, generating the vector $\hat{v}$; and
   discarding last K values of the vector $\hat{v}$, generating reconstructed vector v', such that v'=v if t'=t, wherein the reconstructed vector v' follows the following relationship, assuming t'=t:

$$v' = [I_{2^M} \underbrace{0_{2^M \times K}}_{Discarding}] \times (F_{2^M})^{-1} \times \overbrace{\begin{bmatrix} I_{2^M} \\ 0_{K \times 2^M} \end{bmatrix}}^{Padding} \times M_N \underbrace{\times}_{t'=t} v$$

such that:

$$[I \ 0] \times (F_{2^M})^{-1} \times \begin{bmatrix} I \\ 0 \end{bmatrix} \times M_N = I_N$$

in which $F_{2^M}$ is a power of two sized transform, $M_N$ is a direct transform matrix of arbitrary size N.

2. The method according to claim 1, wherein the forward transform matrix $M_N$ is one of a floating-point, a fixed-point approximation, or an integer transform matrix.

3. The method according to claim 1, wherein the K discarded values follow the relationship:

$$K=L-N$$

where L is a dimension of the inverse transform matrix and N is a size of the vector v.

4. The method according to claim 1, wherein the inverse transform matrix has a power of two size.

5. The method according to claim 1, wherein the power of two sized transform $F_{2^M}$ is a Hadamard matrix in natural order, such that $F_{2^M}=H_{2^M}$:

$$H_2 = \begin{bmatrix} 1 & 1 \\ 1 & -1 \end{bmatrix}$$

$$H_{2^M} = H_2 \otimes H_{2^{M-1}}$$

in such a way that $N \neq 2^M$, $\forall M \in \mathbb{N}$, with $K=2^M-N$, where the forward transform $M_N$ is an adapted Hadamard matrix built as:

$$M_N = \left([I \ 0] \times H_{2^M} \times \begin{bmatrix} I \\ 0 \end{bmatrix}\right)^{-1}.$$

6. The method according to claim 1, wherein arbitrary size adapted DCT matrices is used in an encoder and integer HEVC DCT is used in a decoder.

7. The method according to claim 1, wherein the inverse transform matrix is pre-multiplied by a permutation matrix in such a way that values padded in the padding are at an end of the decoded vector.

8. The method according to claim 1, wherein arbitrary size integer DCT matrix is used, both in an encoder and in a decoder.

9. The method according to claim 1, wherein values of the transformed vector t or reconstructed vector v' are multiplied by fixed-point or floating-point constants to keep their values correctly scaled.

* * * * *